US006997163B2

(12) United States Patent
Arai et al.

(10) Patent No.: US 6,997,163 B2
(45) Date of Patent: Feb. 14, 2006

(54) THROTTLE CONTROL APPARATUS HAVING INTERNALLY SUPPORTING STRUCTURE

(75) Inventors: Tsuyoshi Arai, Kariya (JP); Katsuya Torii, Anjo (JP); Isao Makino, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/961,138

(22) Filed: Oct. 12, 2004

(65) Prior Publication Data

US 2005/0092293 A1 May 5, 2005

(30) Foreign Application Priority Data

Oct. 31, 2003 (JP) ............................ 2003-371405

(51) Int. Cl.
*F02D 11/10* (2006.01)
*F16K 31/04* (2006.01)

(52) U.S. Cl. .................. 123/399; 251/129.12; 251/305

(58) Field of Classification Search ................ 123/337, 123/361, 399; 251/129.11, 129.12, 305, 251/306, 307, 308
See application file for complete search history.

(56) References Cited

U.S. PATENT DOCUMENTS 4,796,580 A * 1/1989 Wakeman .................. 123/321
6,244,565 B1 * 6/2001 McDonnell et al. ... 251/129.12
6,295,968 B2 10/2001 Torii et al. .................. 123/399
6,543,417 B2 4/2003 Tanaka et al. ............. 123/361
6,912,994 B2 * 7/2005 Ozeki et al. ............... 123/399
2004/0129253 A1 * 7/2004 Ozeki et al. ............... 123/399
2005/0022786 A1 * 2/2005 Arai et al .................. 123/399
2005/0022787 A1 * 2/2005 Arai et al. ................. 123/399

FOREIGN PATENT DOCUMENTS

JP 2003-206762 7/2003

* cited by examiner

*Primary Examiner*—Willis R. Wolfe, Jr.

(74) *Attorney, Agent, or Firm*—Nixon & Vanderhye P.C.

(57) ABSTRACT

A throttle apparatus includes a throttle body having a motor insertion hole in which a motor is received. The throttle body has an undercut groove perpendicularly extending with respect to the axial direction of the motor around the insertion hole. A metallic plate is inserted into the undercut groove, so that a motor engaging hole formed in the metallic plate is attached to the throttle body, and a motor engaging hole formed in the metallic plate engages with the motor. A sensor cover is attached to the metallic plate, so that a notch formed in the metallic plate engages with an engaging boss integrally formed in the sensor cover to steadily receive a motor, such that the motor is restricted in the axial direction of the motor and in a direction which is perpendicular to the axial direction of the motor.

15 Claims, 10 Drawing Sheets

THROTTLE CONTROL APPARATUS HAVING INTERNALLY SUPPORTING STRUCTURE

CROSS REFERENCE TO RELATED APPLICATIONS

This application is based on and incorporates herein by reference Japanese Patent Application No. 2003-371405 filed on Oct. 31, 2003.

FIELD OF THE INVENTION

The present invention relates to a throttle control apparatus for an internal combustion engine mounted in a vehicle such as an automobile. Specifically, the throttle control apparatus receives a motor that controls opening degree of a throttle valve that is rotatably received in the throttle body corresponding to an accelerator position.

BACKGROUND OF THE INVENTION

Conventionally, a throttle control apparatus operates a throttle valve to control an amount of air flowing into an internal combustion engine according to JP-A-2002-371866 and JP-A-2003-206762. Recently, a throttle body of the throttle apparatus is formed of resin for reducing weight to improve fuel efficiency according to JP-A-2001-303983.

According to a prior art shown in FIGS. 10 to 12, a throttle apparatus is constructed of a throttle body 101, a throttle valve, a throttle shaft 102, a power unit, a coil spring 103 and an engine control unit. The throttle body 101 internally forms an air intake passage that communicates with cylinders of the engine. The throttle valve is formed in a disc shape to open and close the air intake passage. The throttle shaft 102 is formed in a round bar shape, and the throttle shaft 102 is rigidly connected with the throttle valve. The power unit rotates the throttle valve in the opening direction thereof. The coil spring 103 urges the throttle valve in the closing direction thereof. The engine control unit operates the power unit to control opening degree of the throttle valve to be in a predetermined degree in accordance with an accelerator position operated by the driver to control the engine.

The power unit is constructed of a motor 104 and a reduction gears to rotate the throttle valve and the throttle shaft 102. The reduction gears reduce rotation speed of the driving motor 104 by a predetermined reduction ratio. The reduction gears are constructed of a pinion gear 112, a middle reduction gear 113 and a valve gear 114. The pinion gear 112 is fixed to a motor shaft 111 of the motor 104. The middle reduction gear 113 engages with the pinion gear 112 to be rotated by the pinion gear 112. The valve gear 114 engages with the middle reduction gear 113 to be rotated by the middle reduction gear 113.

A sensor cover 106 is provided to the outer wall face of a cylindrical bore wall 121 of the throttle body 101. The sensor cover 106 accommodates a throttle position sensor (rotation angle detecting device) 105 to detect an opening degree of the throttle valve (valve angle, rotation angle). The sensor cover 106 is integrally formed of thermoplastic.

The throttle control apparatus supplies electricity to the motor 104 in accordance with a signal transmitted from the accelerator position sensor. Rotation power of the motor 104 is transmitted to the throttle shaft 102 via the reduction gears, so that the throttle valve is controlled at a predetermined opening degree. Thus, intake air, which is respectively introduced into cylinders of the engine, is controlled at a predetermined amount.

As shown in FIGS. 11 and 12, a bottomed motor housing 122 is integrally formed with the outer wall of the cylindrical bore wall 121 of the throttle body 101. The motor housing 122 has a motor receiving hole 123 to receive the motor 104 that is a power source of the throttle valve. The throttle body 101 has a has a motor insertion hole 124, through which the motor 104 is inserted into the motor receiving hole 123. The outer face of the bore wall 121 has a throttle hole 125, through which one axial end of the throttle shaft 102 penetrates.

The motor 104 is inserted into the motor receiving hole 123 through the motor insertion hole 124, and a metallic plate 107 is screwed to the motor housing 122. The metallic plate 107 has a fixing hole 131, to which a cylindrical bearing holder 126 of a main frame of the motor 104 is fixed. The motor housing 122 has multiple bosses 133 that respectively have female holes 132, into which tapping screws 109 are screwed.

However, in the conventional structure shown in FIG. 12, a resinous material forming the throttle body 101 may creep after a long period, and screwing force of the tapping screws 109 with respect to the female holes 132 of the bosses 133 may decrease, after a use of the throttle apparatus for a long period. The resinous material forming the throttle body 101 may also creep after a long period. In this case, screwing force of bolts may also decrease with respect to the female holes 132 of the bosses 133, when the bolts are used for screwing the metallic plate 107 to the throttle body 101.

As a result, the position of the motor 104 becomes unstable in the motor housing 122, when screwing force of the tapping screws 109 or the bolts decreases. The pinion gear 112, which is fixed to the motor shaft 111 of the motor 104, cannot properly engage with the middle reduction gear 113. Accordingly, rotation power of the motor 104 is not smoothly transferred to the valve gear 114 that is fixed to one axial end of the throttle shaft 102, and opening degree of the throttle valve cannot be precisely controlled. Therefore, an amount of intake airflow cannot be controlled in accordance with the accelerator position, and reliability of the throttle apparatus may be degraded. Here, nuts may be insert-molded in the motor housing 122 to restrict screwing force of the bolts from decreasing. However, in this structure, the number of components is increased, and production cost is increased.

SUMMARY OF THE INVENTION

In view of the foregoing problems, it is an object of the present invention to produce a throttle control apparatus, in which a plate can be steadily fixed to a throttle body for steadily supporting a motor received in the throttle body without using additional components such as screws. Specifically, the throttle body, which is integrally formed of resin, has an undercut portion around a motor insertion hole, through which the motor is inserted. The plate having a hole is attached to the undercut portion of the throttle body, so that the fixing hole of the plate can be steadily fixed to the motor.

According to the present invention, a throttle control apparatus, which is for an internal combustion engine having cylinders, includes a throttle body, a throttle valve, a substantially cylindrical motor housing, a motor, and a plate. The throttle body defines a cylindrical air intake passage communicating with the cylinders. The throttle valve is received in the air intake passage. The motor housing is integrally formed of resin with the throttle body. The motor housing internally forms a motor insertion hole. The motor is inserted into the motor housing through the motor insertion hole, such that the motor rotates the throttle valve to open and close the air intake passage. The plate is attached to the throttle body.

The plate defines a motor engaging hole that engages with the motor such that the plate restricts movement of the motor in the radial direction of the motor. The throttle body defines an undercut portion in the vicinity of the motor insertion hole. The plate is inserted along the undercut portion, so that the plate is supported by the throttle body, such that the plate covers the motor insertion hole to restrict movement of the motor in the axial direction of the motor.

Alternatively, a throttle control apparatus has a resinous throttle body that is integrally formed with a substantially cylindrical motor housing that defines a motor insertion hole. The throttle body defines an undercut portion in the vicinity of the motor insertion hole. A manufacturing method of the throttle control apparatus includes following processes. The motor is inserted into the motor housing through the motor insertion hole. A plate is inserted along the undercut portion, such that the plate covers the motor insertion hole, so that the plate restricts movement of the motor in the axial direction of the motor. A motor engaging hole formed in the plate is engaged with the motor, such that the plate restricts movement of the motor in the radial direction of the motor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 1:
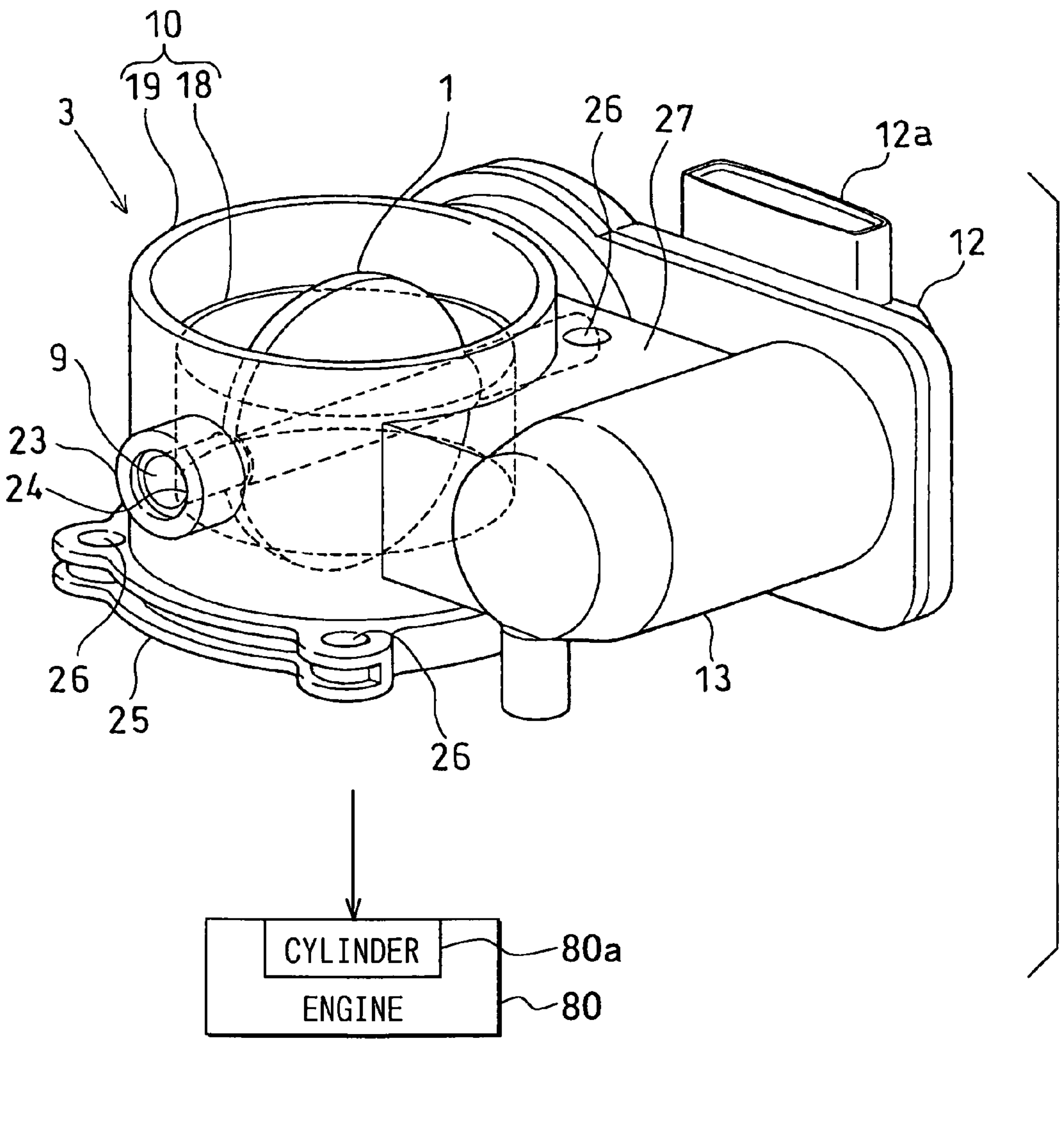
FIG. 1 is perspective front view showing a throttle apparatus according to a first embodiment of the present invention.
Figure 2:
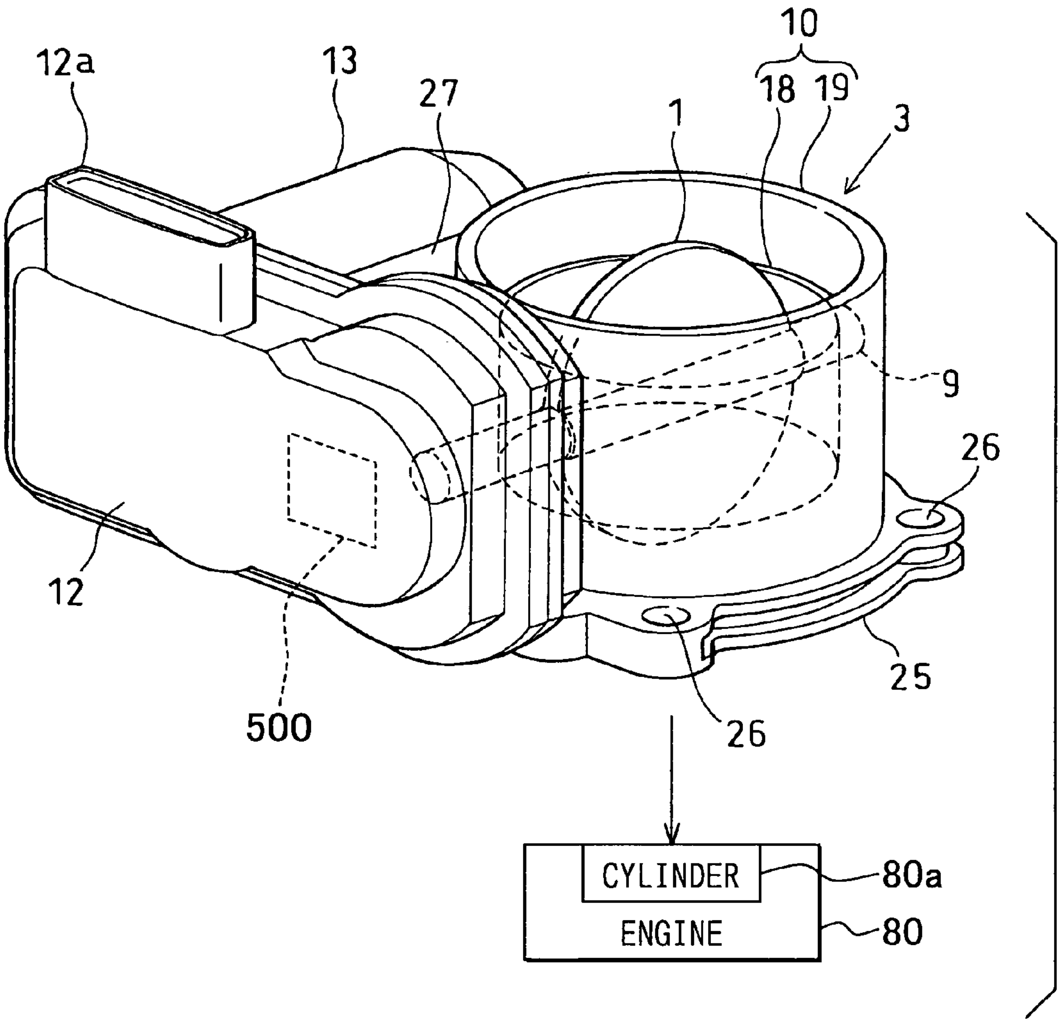
FIG. 2 is perspective rear view showing the throttle apparatus according to the first embodiment.

As shown in FIGS. 1 and 2, an electrically controlled throttle apparatus is constructed of a throttle valve 1, a motor 2, a coil spring (not shown), reduction gears, an actuator case, a throttle body 3 and an ECU (electronic control unit). The throttle valve 1 controls an amount of intake air flowing into cylinders 80*a* of an internal combustion engine 80. The motor 2 rotates the throttle valve 1, so that the throttle valve 1 is rotated in an open direction, in which the throttle valve 1 is opened to be in a full throttle position (full open position), or a close direction, in which the throttle valve 1 is closed to be in an idling position (full close position). The motor 2 serves as an actuator (valve operating means). The coil spring urges the throttle valve 1 in the close direction. The reduction gears (power transmission unit) transmit rotation power of the motor 2 to the throttle valve 1. The actuator case rotatably receives the reduction gears.

The throttle body 3 internally forms an air intake passage 10*a* introducing intake air into each cylinders 80*a* of the engine 80. The ECU (electronic control unit) electrically controls the motor 2. The ECU is connected to an accelerator position sensor (not shown) that converts an operation degree (accelerator operation amount) of an accelerator pedal stepped by a driver into an electronic signal (accelerator position signal) in order to output the accelerator position signal to the ECU.

The accelerator position signal represents the accelerator operation amount. The electrically controlled throttle apparatus has a throttle position sensor 500 (FIG. 2) that converts an opening degree of the throttle valve 1 into an electronic signal (throttle position signal) in order to output the throttle position signal to the ECU. The throttle position signal represents an opening degree of the throttle valve 1. The ECU performs PID (proportional, integral and differential [derivative]) feedback control with respect to the motor 2 in order to eliminate deviation between the throttle position signal transmitted from the throttle position sensor 500 and the accelerator position signal transmitted from the accelerator position sensor.

The throttle position sensor (rotation angle sensor) 500 is constructed of permanent magnets (not shown), yokes (not shown), a non-contacting detecting element (not shown), and the like. The permanent magnets are separated substantially rectangular magnets used for generating a magnetic field. The permanent magnets are provided to one axial end of the throttle shaft 9. The yokes are constructed of separated substantially arc-shaped pieces, and are magnetized by the permanent magnets.

The non-contacting detecting elements, such as hall elements, hall ICs or magnetic resistance elements are provided in the inner circumferential periphery of the yokes to be opposed to each other. The non-contacting detecting elements receive magnetic force to detect a rotation angle (valve angle) of the throttle valve 1. The rotation angle sensor 500, specifically non-contacting detecting elements are integrally arranged in the sensor cover 12 fixed to the outer wall of the throttle body 3. The separated permanent magnets and the separated yokes are secured to the inner periphery of a valve gear, which constructs the reduction gears, using glue or the like.

The actuator case is constructed of a gearbox (gear housing, case body) 11 and a sensor cover (gear cover) 12. The gearbox 11 is integrally formed of resin with the outer periphery of the throttle body 3. The sensor cover 12 supports the hall elements of the rotation angle sensor 500, terminals and a stator. The sensor cover 12 covers the opening side of the gearbox 11.

The gearbox 11 is made of the same resinous material as that of the throttle body 3, and is molded in a predetermined shape to construct a gear chamber that rotatably receives the reduction gears. The sensor cover 12 is formed of a resinous material such as thermo plastic in a predetermined shape, in order to electrically insulate between the terminals of the rotation angle sensor 500 and power-supply terminals of the motor 2. The sensor cover 12 has an engaged part that is engaged with a corresponding protruded engaging part formed on the opening side of the gearbox 11 of the throttle body 3. The engaged part of the sensor cover 12 and the engaging part of the gearbox 11 are fixed using a rivet, a screw (not shown), or are thermally swaged with each other, for example. A substantially cylindrical shaped receptacle 12*a* is integrally formed with the sensor cover 12 to be connected with an electrical connector (not shown).

The throttle valve 1 is made of a thermo stable resinous material, such as PPS (poly phenylene sulfide), PA (polyamide), PP (polypropylene) or PEI (polyether imide). The throttle valve 1 is a butterfly-type rotary valve (resinous valve). The throttle valve 1 has a rotation center substantially perpendicularly to the central axis of the bore wall part 10 of the throttle body 3. The rotation angle of the throttle valve 1 is changed from that of the full-close position to that of the full-open position, so that an amount of intake air introduced into the engine 80 can be controlled. The throttle valve 1 is constructed of a substantially disc-shaped resinous disc part (disc-shaped part) and a substantially cylindrical resinous shaft part (cylindrical part). The throttle valve 1 is integrally formed with the outer periphery of a metallic valve supporting portion of the throttle shaft 9, so that the throttle valve 1 and the throttle shaft 9 can integrally rotate.

The throttle shaft 9 is a shaft formed of a metallic material such as brass or stainless steel to be in a substantially round-bar shape or the like, so that the throttle shaft 9 serves as a metallic shaft portion of the throttle valve 1. The throttle shaft 9 has the valve supporting portion for supporting the throttle valve 1. The valve supporting portion is insert molded inside of a resinous shaft part of the throttle valve 1 to reinforce the resinous throttle valve 1.

One end portion of the throttle shaft 9 on the left side end in FIG. 1 exposes (protrudes) from one end face of the resinous shaft part of the throttle valve 1 to serve as a first bearing sliding part that rotatably slides with respect to a first valve bearing (not shown) of the throttle body 3. The other end side (second end side) of the throttle shaft 9 on the right side end in FIG. 1 exposes (protrudes) from the second end face of the resinous shaft part of the throttle valve 1 in order to serve as a second bearing sliding part (not shown) that rotatably slides with respect to a second valve bearing (not shown) of the throttle body 3. The valve gear (not shown) constructing the reduction gears is integrally provided on the second end portion of the throttle shaft 9 on the right side end in FIG. 1.

The power unit, which rotates the throttle valve 1 and the throttle shaft 9 in the opening direction, is constructed of the motor 2 serving as the power source and the reduction gears that reduce rotation speed of the motor 2 by the predetermined reduction ratio.

The reduction gears are constructed of a pinion gear 14, a middle reduction gear (not shown) and the valve gear for driving the throttle shaft 9 that rotates the throttle valve 1. The pinion gear 14 is secured to the outer periphery of the motor shaft of the motor 2. The middle reduction gear engages with the pinion gear 14 to be rotated by the pinion gear 14. The valve gear engages with the middle reduction gear to be rotated by the middle reduction gear. The reduction gears serve as the power transmission unit that transmits rotation power of the motor 2 to the throttle shaft 9.

The motor 2 is an electric actuator (power source) that is integrally connected with motor electric terminals received in the sensor cover 12. The motor shaft (not shown) forwardly or reversely rotates when the motor 2 is energized.

Figure 3:
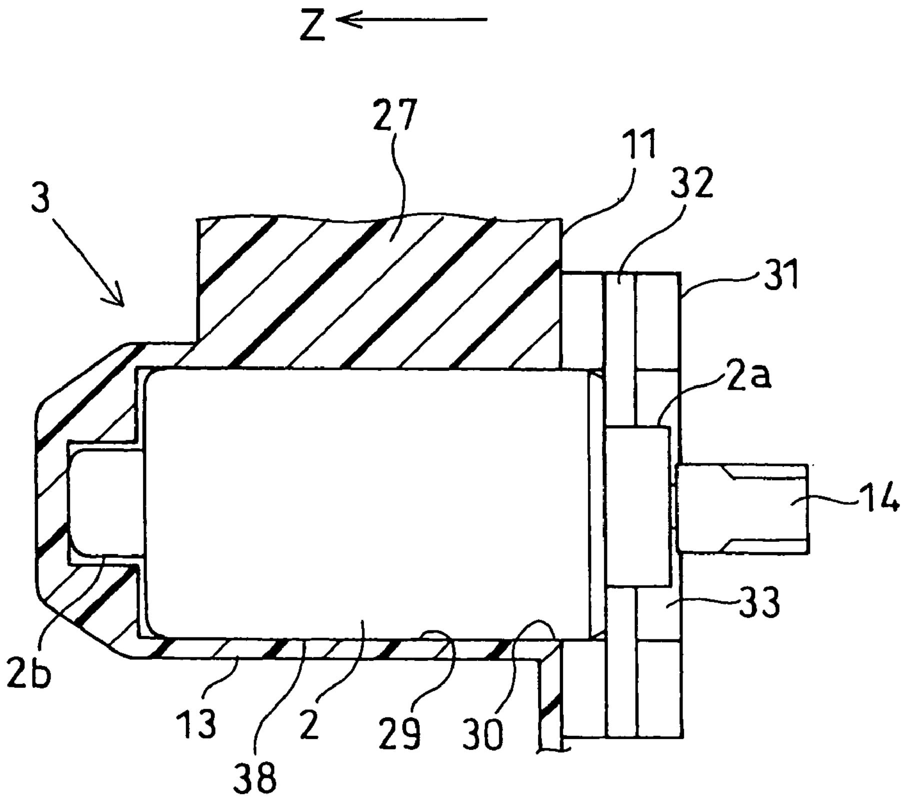
FIG. 3 is a cross-sectional side view showing a housing of the throttle apparatus receiving a motor according to the first embodiment.

As shown in FIG. 3, the motor 2 is received in a substantially cylindrical motor housing 13. A cylindrical bearing holder (cylindrical engaged portion, first small diametric protrusion) 2*a* is integrally formed on the side of a front end portion (tip end portion) of a front end frame of the motor 2 on the right side in FIG. 3. The first small diametric protrusion 2*a* accommodates a bearing such as a ball bearing (not shown) that rotatably supports one end portion (front end portion, first end portion) of the motor shaft.

Figure 4A:
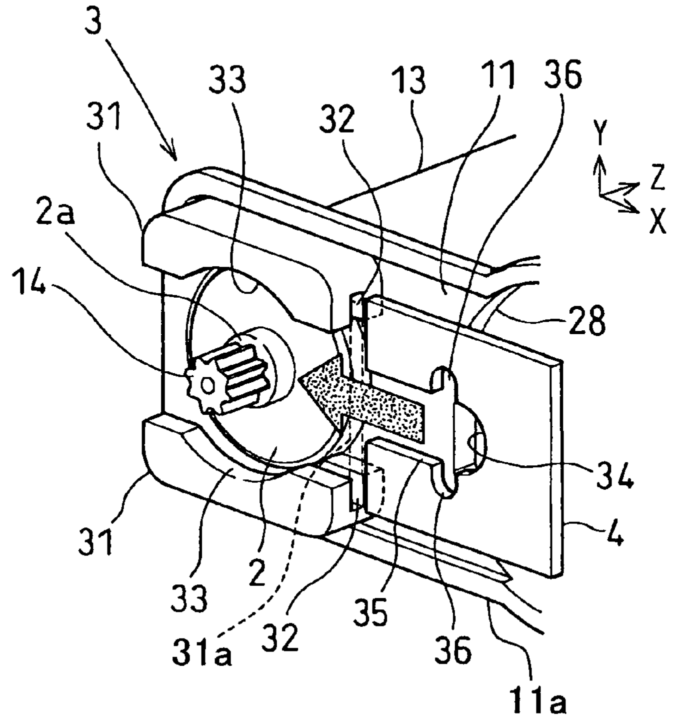
FIG. 4A is a perspective view showing a plate and the housing receiving the motor.
Figure 4B:
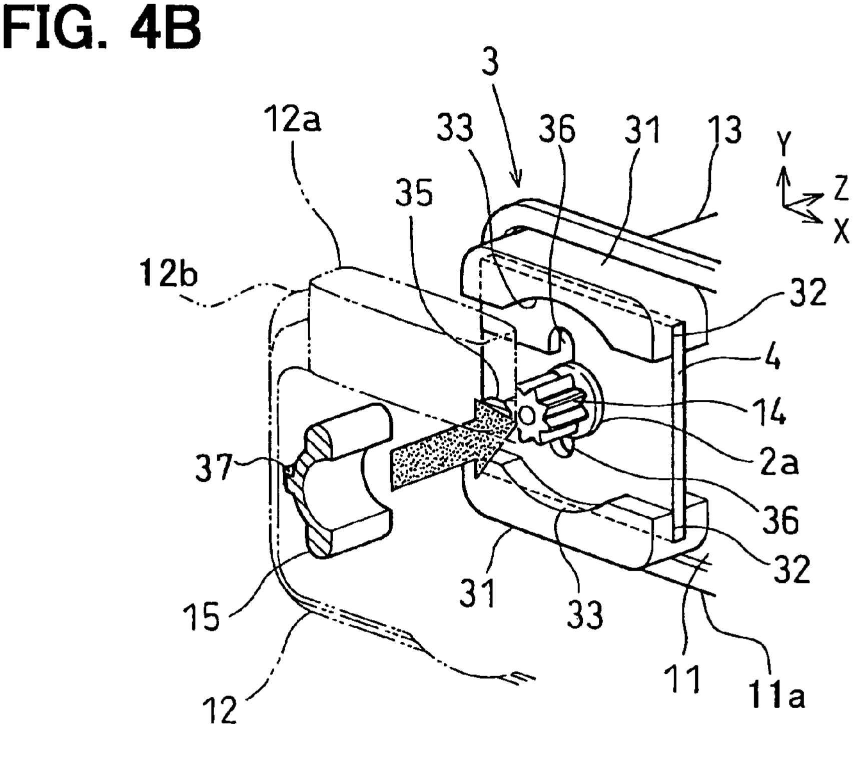
FIG. 4B is a perspective view showing a sensor cover and the plate attached to the housing according to the first embodiment.

As shown in FIGS. 4A and 4B, the first small diametric protrusion 2*a* constructs a circular protrusion provided to one axial end portion (first end face of the front end frame) of the motor 2. The first small diametric protrusion 2*a* engages with a motor engaging hole 34 formed in a metallic plate 4, and the first small diametric protrusion 2*a* is inserted between the metallic plate 4 and an engaging boss 15 (plate restricting means) of the sensor cover 12.

Figure 5:
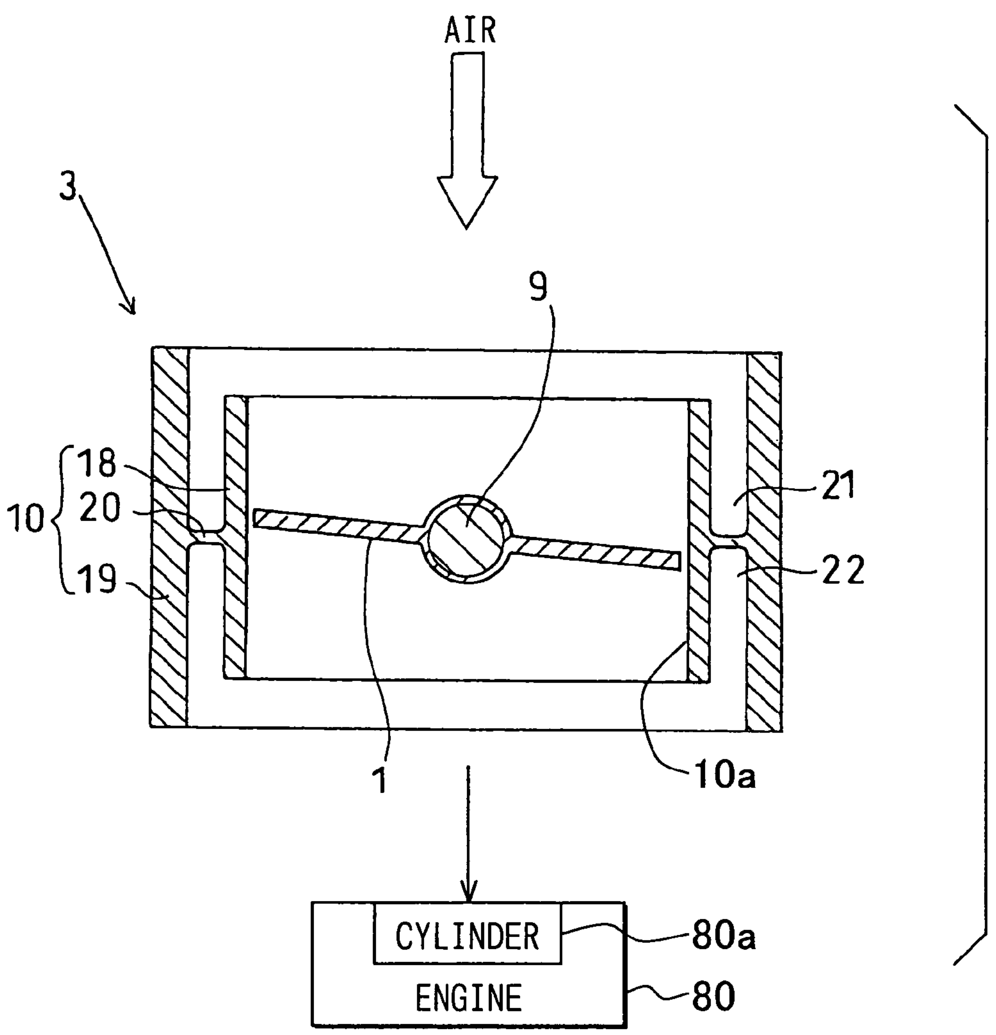
FIG. 5 is a cross-sectional side view showing a throttle body rotatably received in a throttle body according to the first embodiment.

As shown in FIG. 5, the throttle body 3 is a throttle housing that includes the substantially cylindrical-shaped bore wall part 10 internally forming a circular-shaped intake passage 10*a,* through which intake air flows into the cylinders 80*a* of the engine 80. The bore wall part 10 internally receives the disc-shaped throttle valve 1, such that the throttle valve 1 can open and close the circular-shaped intake passage 10*a* of the bore wall part 10. The bore wall part 10 rotatably receives the throttle valve 1 in the intake passage (bore) 10*a,* such that the throttle valve 1 can rotate from the full close position to the full open position. The throttle body 3 is screwed onto an intake manifold of the engine 80 using a fasting bolt or a screw (not shown). The throttle body 3 is formed of a thermo stable resinous material, such as PPS, PA, PP or PEI.

The bore wall part 10 of the throttle body 3 is formed in a double-pipe structure, in which a substantially cylindrical bore outer pipe 19 is arranged on the radially outer side of a substantially cylindrical bore inner pipe 18. The bore inner pipe 18 is an inner cylindrical part that forms an inner circumferential periphery. The bore outer pipe 19 is an outer cylindrical part that forms an outer member of the throttle body 3. The bore inner pipe 18 and the bore outer pipe 19 have an intake-air inlet part (air intake passage) on the upper side in FIG. 5, and an intake-air outlet part (air intake passage) on the lower side in FIG. 5. Intake air drawn from an air cleaner (not shown) passes through an intake pipe (not shown), the intake-air inlet part of the bore wall part 10.

Subsequently, the intake air flows into a surge tank of the engine 80 or the intake manifold after passing through the intake-air outlet part of the bore wall part 10. The bore inner pipe 18 and the bore outer pipe 19 are integrally formed with each other. The bore inner pipe 18 and the bore outer pipe 19 have a substantially the same inner diameter and a substantially the same outer diameter along the direction of intake airflow, i.e., the direction from the upper side to the lower side in the vertical direction of FIG. 5.

The bore inner pipe 18 internally has the air intake passage 10*a,* through which intake air flows to the engine 80. The throttle valve 1 is rotatably provided in the air intake passage 10*a* of the bore inner pipe 18. A cylindrical space (annular space) is formed between the bore inner pipe 18 and the bore outer pipe 19, and the cylindrical space is circumferentially blocked, i.e., partitioned by an annular connecting part 20 at a longitudinally intermediate section thereof. For instance, the longitudinally intermediate section of the cylindrical space is a section along an outer circumferential direction of the throttle valve 1 in the full close position. Namely, the longitudinally intermediate section is a circumferential section of the bore wall part 10 passing through the substantially axial center of the throttle shaft 9. The annular connecting part 20 connects the outer circumferential periphery of the bore inner pipe 18 and the inner circumferential periphery of the bore outer pipe 19, such that the annular connecting part 20 blocks substantially entirely over the circumferential area of the cylindrical space formed between the bore inner pipe 18 and the bore outer pipe 19.

The cylindrical space between the bore inner pipe 18 and the bore outer pipe 19 located on the axially upstream side with respect to the annular connecting part 20 serves as a blockade recess part (moisture trapping groove) 21 for blocking moisture flowing along the inner periphery of the intake pipe toward the intake manifold. The cylindrical space between the bore inner pipe 18 and the bore outer pipe 19 located on the axially downstream side with respect to the annular connecting part 20 serves as a blockade recess part (moisture trapping groove) 22 for blocking moisture flowing along the inner periphery of the intake manifold.

Referring back to FIGS. 1 and 2, the bore inner pipe 18 and the bore outer pipe 19 have the substantially cylindrical first valve bearing (not shown) and the substantially cylindrical second valve bearing 23 that are integrally molded of resin. The first valve bearing rotatably supports the first bearing sliding part of the throttle shaft 9. The second valve bearing 23 rotatably supports the second bearing sliding part of the throttle shaft 9. A circular-shaped first shaft hole (not shown) is formed in the first valve bearing, and a circular-shaped second shaft hole 24 is formed in the second valve bearing 23. A plug (not shown) is provided to the second valve bearing 23 for plugging the opening of the second valve bearing 23. A stay part 25 is integrally formed of resin on the outer periphery of the bore outer pipe 19. The stay part 25 is connected with a connecting end face of the intake manifold of the engine 80 using fastening members such as bolts (not shown), when the throttle body 3 is mounted on the engine 80. The stay part 25 is provided on the outer wall of the bore outer pipe 19 located on the lower end side in FIG. 1. The stay part 25 radially outwardly protrudes from the outer circumferential periphery of the outer wall of the bore outer pipe 19, and has insertion holes 26, through which the fastening members such as the bolts pass.

As shown in FIG. 4, in this embodiment, a recess portion 28, a substantially circular motor insertion hole 30 (FIG. 3) and a pair of protrusions 31 are integrally formed in the bottom wall portion of the gearbox 11 of the throttle body 3. The valve gear, which partially constructs the reduction gears, is rotatably received in the recess portion 28. The motor 2 is inserted into a motor receiving hole 29 (FIG. 3) formed in the motor housing 13 through the motor insertion hole 30 (FIG. 3).

The protrusions 31 are provided in the vicinity of the motor insertion hole 30, such that the protrusions 31 oppose to each other substantially with respect to the axial direction of the motor insertion hole 30. The protrusions 31 oppose vertically in FIG. 4, such that the protrusions 31 inserts a front end frame of the motor 2 or the motor insertion hole 30 vertically in FIG. 4. That is, the protrusions 31 oppose to each other substantially perpendicularly to the axial direction of the motor 2 over the motor 2 received in the motor insertion hole 29. The protrusions 31 are integrally formed with the bottom wall portion of the gearbox 11. The protrusions 31 respectively protrude to the one axial end side, i.e., the front side of the motor 2 from the bottom face of the gearbox 11 of the throttle body 3. That is, the protrusions 31 respectively protrudes to the axially front end side of the motor insertion hole 30 in the minus direction of the Z-axis in FIG. 3A.

Undercut groove (recessed groove, engaging groove, hooking groove) 32 is formed in each protrusion 31 in the forming process to serve as an undercut portion. Specifically, the undercut groove 32 is respectively formed in each face of the protrusion 31 that opposes to the other face of the protrusion 31 perpendicularly to the axial direction of the motor 2, e.g. in the radial direction of the motor 2. That is, one of the undercut groove 32 is formed in the lower end face of the upper protrusion 31 in FIG. 4A, and the other undercut groove 32 is formed in the upper end face of the lower protrusion 31 in FIG. 4A. The metallic plate 4 is inserted between the undercuts 32. Each undercut groove 32 extends in the same direction as the direction, in which the metallic plate 4 is inserted along the minus direction of the X-axis, i.e., in the horizontal direction in FIG. 4A.

A substantially rectangular space (insertion hole of the metallic plate) 31*a* is formed between the undercut grooves 32 of the protrusions 31 on the right side in FIG. 4A. The rectangular space 31*a* has a width in the plus direction of the Z-axis, such that the width of the rectangular space 31*a* is substantially equivalent to the thickness of the metallic plate 4.

Arc-shaped recessions 33 are respectively formed in the inner faces of the protrusions 31 that oppose to each other. The arc-shaped recessions 33 respectively have arc-shapes, such that the arc-shapes form a part of a circle having a center substantially corresponding to the axis of the motor insertion hole 30. The motor 2 can be easily inserted into the motor receiving hole 29 through the arc-shaped recessions 33 and the motor insertion hole 30. The metallic plate 4 is inserted between the undercut grooves 32 of the protrusions 31, which oppose to each other, to construct a first metallic plate connections. Each first metallic plate connection restricts the metallic plate 4 from vertically moving in the plus and the minus directions of the Y-axis in FIG. 4A substantially perpendicularly to the insertion direction of the metallic plate 4.

The metallic plate 4 is formed of a metallic material such as brass and stainless steel to be in a substantially rectangular flat shape. The metallic plate 4 is inserted between the undercut grooves 32 formed on the inner faces of the protrusions 31 that oppose to each other. The metallic plate 4 is fixed between the protrusions 31 of the throttle body 3, so that the metallic plate 4 covers the axially front end side of the motor 2, i.e., the axially front side of the motor insertion hole 30 in the minus direction of the Z-axis in FIG. 4A. The metallic plate 4 has a substantially semicircular motor engaging hole 34 that engages with the first small diametric protrusion 2*a* of the motor 2. The motor engaging hole 34 engages with the first small diametric protrusion 2*a* of the motor 2 on the right side in FIG. 4A to construct a first motor protrusion connection that restricts the motor 2 from rightwardly moving in the plus direction of the X-axis in FIG. 4A. The first motor protrusion connection also restricts the motor 2 from vertically moving in the plus and the minus directions of the Y-axis in FIG. 4A The metallic plate 4 has supported portions in the upper end thereof and the lower end thereof that are respectively inserted into the undercut grooves 32, so that the supported portions are supported by the protrusions 31. The end face of the metallic plate 4 on the side of the motor 2 contacts with one axial end face of the motor 2, i.e., first end face of the front end frame of the motor 2 to construct a first motor connection that restricts movement of the motor 2 in the axial direction of the motor 2. The metallic plate 4 has a substantially rectangular notch 35 that communicates with the motor engaging hole 34. The notch 35 of the metallic plate 4 opens leftwardly in the radial direction of the motor 2, i.e., minus direction of the X-axis in FIG. 4A, which substantially along the insertion direction, in which the metallic plate 4 is inserted between the undercut grooves 32 of the protrusions 31 along the radial direction of the motor 2. That is, the notch 35 of the metallic plate 4 opens substantially in the same direction, in which the motor engaging hole 34 of the metallic plate 4 engages with the first small diametric protrusion 2*a* of the motor 2. The notch 35 has a width slightly larger than the diameter of the first small diametric protrusion 2*a* of the motor 2. The metallic plate 4 has boss engaging holes 36 formed on the outer side in the facial direction of the metallic plate 4 with respect to the motor engaging hole 34. The boss engaging holes 36 respectively communicate with the motor engaging hole 34 and the notch 35 in the metallic plate 4. Each boss engaging hole 36 has a substantially arc-shaped or substantially C-shape, so that the engaging boss 15 of the sensor cover 12 partially engages with the boss engaging hole 36.

The engaged portion 12*b* of the sensor cover 12 is engaged to the protruded engaging portion 11*a* formed on the opening side of the gearbox 11 of the throttle body 3. In this situation, the engaging boss 15, which is insert-formed in the sensor cover 12, partially engages with the boss engaging holes 36 formed in the metallic plate 4. The engaging boss 15 is formed of a metallic material such as brass, stainless steel or an elastic material such as rubber. The engaging boss 15 is formed in a predetermined shape such as a substantially C-shape. Specifically, the engaging boss 15 is constructed of engaging portions such as a pair of substantially semicircular portions and a substantially arc-shaped portion. The substantially semicircular portions tightly engage respectively with the boss engaging holes 36 formed in the metallic plate 4. The substantially arc-shaped portion connects the substantially semicircular portions therebetween in the engaging boss 15. A protrusion (rib) 37 is integrally formed on the outer wall face (outer circumferential face) of the substantially arc-shaped portion of the engaging boss 15 to tightly connect the engaging boss 15 with the resinous material forming the sensor cover 12.

The arc-shaped inner wall (inner peripheral wall) of the engaging boss 15 engages with the first small diametric protrusion 2*a* of the motor 2 on the left side in FIG. 4B to construct a second motor protrusion connection. The second motor protrusion connection restricts the motor 2 from leftwardly moving in the radial direction of the motor 2, i.e., minus direction of the X-axis in FIG. 4B. The second motor protrusion connection also restricts the motor 2 from vertically moving in the radial direction of the motor 2, i.e., plus and minus direction of the Y-axis in FIG. 4B.

The pair of the substantially semicircular outer wall portions (outer circumferentially portions) of the engaging boss 15 engages with the right end side of the notch 35 in FIG. 4B and the boss engaging holes 36 to construct a second metallic plate connection. The second metallic plate connection restricts the metallic plate 4 from rightwardly moving, i.e., in the minus direction of the X-axis in FIG. 4B, substantially perpendicularly to the direction of the thickness of the metallic plate 4. The second metallic plate connection also restricts the metallic plate 4 from vertically moving, i.e., in the plus and the minus directions of the Y-axis in FIG. 4B, substantially perpendicularly to the direction of the thickness of the metallic plate 4.

As shown in FIG. 3, the motor receiving hole 29 of the motor housing 13 has a circular cross-sectional shape that tightly support a rear end frame of the motor 2 or an end yoke of the motor 2. The bottom wall face of the motor housing 13 contacts with the axially second end portion of the motor 2. That is, the bottom wall face of the motor housing 13 on the left side in FIG. 3 contacts with the second end face of the rear end frame of the motor 2 or the second end face of the end yoke of the motor 2 on the left side in FIG. 3 to construct a second motor connection. The second motor connection restricts the motor 2 from axially moving on the second end side, i.e., the side of the rear end of the motor 2 in the plus direction of the Z-axis in FIG. 3. As shown in FIG. 4A, the inner circumferential face of the sidewall of the motor housing 13 contacts with the circumferential sidewall of a large diameter portion of the motor 2 to construct the third motor connection. The third motor connection restricts the motor 2 from rightwardly and leftwardly, i.e., horizontally moving in the radial direction of the motor 2, i.e., in the plus and the minus directions of the X-axis in FIG. 4A. The third motor connection also restricts the motor 2 from upwardly and downwardly, i.e., vertically moving in the radial direction of the motor 2, i.e., in the plus and the minus directions of the Y-axis in FIG. 4A. A predetermined cylindrical gap can be formed between the inner circumferential periphery of the sidewall of the motor housing 13 and the circumferential sidewall of the motor 2.

A cushion member such as a blade spring or an insulator such as an elastic rubber can be provided between the bottom wall face of the motor receiving hole 29 and the rear end frame of the motor 2 or the end yoke of the motor 2. The blade spring and the insulator can restrict vibration of the engine from transferring to the motor 2, so that vibration proof property of the motor 2 can be enhanced.

As follows, an assembling process of the throttle control apparatus is described.

A pair of the protrusions 31 is integrally formed of resin on the bottom wall portion of the gearbox 11 of the throttle body 3 in the vicinity of the motor insertion hole 30, such that the protrusions 31 are arranged radially symmetrically with respect to the axis of the motor insertion hole 30, for example. The protrusions 31 respectively have undercut portions, i.e., undercut grooves 32. As shown in FIG. 3, the motor 2 is inserted into the motor receiving hole 29 of the motor housing 13 from the motor insertion hole 30 formed in the gearbox 11 of the throttle body 3. The second end face of the rear end frame of the motor 2 or the second end face of the end yoke of the motor 2, which are located on the left side in FIG. 3, contacts with the bottom face of the bottom portion of the motor housing 13, i.e., the bottom face of the motor receiving hole 29.

As shown in FIG. 4A, subsequently, the metallic plate 4 is moved along the protrusions 31 in the insertion direction substantially perpendicularly to the direction of the thickness of the metallic plate 4. That is, the metallic plate 4 is leftwardly moved along the protrusions 31 substantially perpendicularly to the axial direction of the motor 2 from the outer side of the protrusions 31. The metallic plate 4 is leftwardly moved along the face of the front end frame of the motor 2 located on the first end side on the left side in FIG. 4A. The metallic plate 4 is temporally fixed to the throttle body 3, such that the metallic plate 4 covers the axially first end side (front side) of the motor 2 and the axially front side of the motor insertion hole 30 on the side in the minus direction of the Z-axis in FIG. 4A.

Thus, the motor 2 is restricted from radially vertically moving in the plus and the minus directions of the Y-axis and radially rightwardly moving in the plus direction of the X-axis. The motor 2 is also restricted from axially moving in the minus direction of the Z-axis in FIG. 4A, because the motor 2 is restricted on the first end side thereof. Referring back to FIG. 3, the motor 2 is further restricted from axially moving in the plus direction of the Z-axis in FIG. 3 by the bottom wall face of the bottom wall portion of the motor housing 13, i.e., bottom wall face of the motor receiving hole 29 on the second end side of the motor 2. The metallic plate 4 is restricted from vertically moving in the radial direction of the motor 2 substantially perpendicularly to the direction of the thickness of the metallic plate 4, i.e., substantially in the plus and the minus directions of the Y-axis in FIG. 4B by the bottom faces of the undercut grooves 32 of the throttle body 3. The metallic plate 4 is also restricted from moving in the axial direction of the motor 2 substantially parallel to the direction of the thickness of the metallic plate 4, i.e., in the plus and the minus directions of the Z-axis in FIG. 4B by the opposed side faces of the undercut grooves 32 of the throttle body 3.

The first small diametric protrusion 2*a* of the motor 2 engages with the motor engaging hole 34 of the metallic plate 4 through the notch 35 on the right side in FIG. 4A, when the upper and the lower ends of the metallic plate 4 are respectively inserted into the corresponding undercut grooves 32. That is, the metallic plate 4 engages with a portion of the first small diametric protrusion 2*a* of the motor 2 on the right side in FIG. 4A. As shown in FIG. 4B, the engaged portion 12*b* of the sensor cover 12 is engaged with the protruded engaging portion 11*a* formed on the opening side of the gearbox 11 of the throttle body 3. The engaging boss 15, which is insert-formed in the sensor cover 12, engages with the boss engaging holes 36 formed in the metallic plate 4, simultaneously with engagement between the sensor cover 12 and the throttle body 3. Thus, the metallic plate 4 is restricted from rightwardly and leftwardly moving in the radial direction of the motor 2 perpendicularly to the direction of the thickness of the metallic plate 4, i.e., in the plus and the minus directions of the X-axis. The metallic plate 4 is fixed to the throttle cover 3, such that the metallic plate 4 covers the axially first end side, i.e., front side of the motor 2. That is, the metallic plate 4 covers the axially front side of the motor insertion hole 30 on the side of the minus direction of the Z-axis. The motor 2 can be restricted from leftwardly moving in the minus direction of the X-axis in FIG. 4A along the radial direction of the motor 2 by the motor engaging hole 34 formed in the metallic plate 4 and the engaging boss 15 insert-formed in the sensor cover 12.

When a driver steps an accelerator pedal, an accelerator position signal is transmitted from the acceleration position sensor to the ECU. The ECU supplies electricity to the motor 2 to rotate the motor shaft of the motor 2, such that a rotation angle of the throttle valve 1 is controlled at a predetermined angle. Torque of the motor 2 is transmitted to the valve gear via the pinion gear 14 and the middle reduction gear. Thus, the valve gear is rotated against resilient force of the coil spring in accordance with the accelerator position. The valve gear is rotated, so that the throttle shaft 9 (FIG. 9) is rotated by the same angle as the angle of the valve gear. The throttle valve 1 is rotated in the opening direction, in which the throttle valve 1 is opened from the full-close position to the full open position. As a result, the intake air passage formed in the bore inner pipe 18 of the throttle body 3 is opened by the predetermined degree, so that rotation speed of the engine is changed in accordance with the accelerator position.

In the throttle control apparatus for the engine, the undercut grooves 32 formed in the throttle body 3 and the metallic plate 4 are connected with each other. Simultaneously, the motor engaging hole 34 and the notch 35, which are formed in the metallic plate 4, and the engaging boss 15, which is integrally formed with the sensor cover 12, are also engaged. Specifically, the motor 2 is fixed to the motor housing 13, subsequently the metallic plate 4 is fixed to the undercut groove 32, and the engaging boss 15 provided to the sensor cover 12 engages with the boss engaging hole 36 of the metallic plate 4. Thus, the motor engaging hole 34 of the metallic plate 4 engages with the first small diametric protrusion 2*a* of the motor 2 to support the first small diametric protrusion 2*a*. Therefore, the motor 2 can be steadily fixed (restricted) in the motor housing 13 that is integrally formed of resin with the throttle body 3, without screwing the metallic plate 4 to the throttle body 3. Therefore, the number of the components and production cost of the throttle control apparatus do not increase, the structure of the throttle control apparatus can be simplified, and production cost can be reduced compared with the structure, in which the metallic plate 4 is screwed to the throttle body 3.

Besides, the metallic plate 4 is not screwed to the throttle body 3, therefore supporting structure of the metallic plate 4 is not degraded due to creep of the resinous material forming the throttle body 3 after use for a long period. Accordingly, the motor 2 can be restricted from being unstable in the motor receiving hole 29 of the motor housing 13. Besides, the pinion gear 14, which is fixed to the motor shaft of the motor 2, and the middle reduction gear can be restricted from causing improper engagement that is due to misalignment therebetween. Therefore, rotation power of the motor 2 can be transmitted to the valve gear, which is fixed to axially one end of the throttle shaft 9, via the reduction gears, so that opening degree of the throttle valve 1 can be properly controlled. Thus, an amount of intake air can be obtained in accordance with the accelerator position, so that reliability of the throttle control apparatus can be totally enhanced.

Here, spring hooks can be respectively provided to the upper end portion and the lower end portion of the metallic plate 4 on the left side in FIG. 4A to resiliently hook respectively to the pair of protrusions 31, which are integrally formed with the throttle body 3. A spring hook can be provided to the inner side of the notch 35 of the metallic plate 4 to resiliently hook to the first small diametric protrusion 2*a* of the motor 2 on the left side in FIG. 4A. In this structure, the motor 2 and the metallic plate 4 can be fixed to the throttle body 3, even the engaging boss 15 is not provided to the sensor case 12. Especially, the metallic plate 4 can be restricted from moving in both radial directions, in which the metallic plate 4 is inserted along the undercut grooves 32 and the opposite direction as the insertion direction of the metallic plate 4, in the plus and the minus directions of the X-axis. Therefore, components and production cost can be reduced.

(Second Embodiment)

Figure 6A:
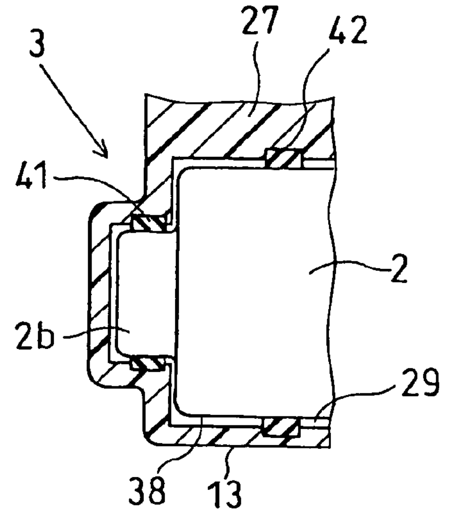
FIG. 6A is a cross-sectional side view showing the motor and elastic members received in the housing.
Figure 6B:
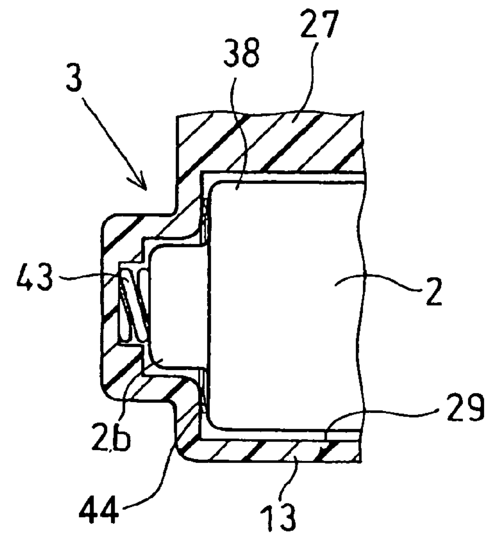
FIG. 6B is a cross-sectional side view showing the motor and resilient members received in the housing according to a second embodiment in the present invention.

As shown in FIGS. 6A and 6B, the motor receiving hole 29 is formed in the motor housing 13 that is integrally formed of resin with the throttle body 3. The motor receiving hole 29 has a circular cross-section, in which the motor 2 is received such that a predetermined gap is formed between the inner wall face of the motor receiving hole 29 and the rear end frame of the motor 2 or the end yoke of the motor 2 therebetween. As shown in FIG. 6A, the motor 2 has a second small diametric protrusion 2*b* that is integrally formed with the axially end face of the rear end frame of the motor 2, in this embodiment. The second small diametric protrusion 2*b* receives a bearing that rotatably supports the rear end portion of the motor shaft, for example.

An elastic member 41 such as a synthetic rubber member can be provided between the inner circumferential periphery of the inner wall of the motor receiving hole 29 of the motor housing 13 and the outer circumferential periphery of the sidewall of the second small diametric protrusion 2*b* along the circumferential direction of the motor 2. Alternatively, another elastic member 42 can be provided between the inner circumferential periphery of the inner wall of the motor housing 13 and the outer circumferential periphery of the sidewall of the large diameter portion of the motor 2 along the circumferential direction of the motor 2.

Alternatively, as shown in FIG. 6B, a resilient member 43 such as a coil spring can be provided between the second small diametric protrusion 2*b* and the bottom wall face of the bottom wall portion of the motor housing 13 in the axial direction of the motor 2. The second small diametric protrusion 2*b* is integrally formed with the end portion of the rear end frame of the motor 2. Alternatively, a ring-shaped resilient member 44, such as a blade spring or a wave washer can be provided between the rear end portion of the end frame of the motor 2 and the bottom wall face of the bottom wall portion of the motor housing 13 in the axial direction of the motor 2.

Thus, the bottom wall portion and the sidewall of the motor housing 13 can restrict the motor 2 from axially and radially moving. Furthermore, the elastic members 41, 42 such as the synthetic rubber members and the resilient members 43, 44, such as the coil spring, the blade spring and the wave washer are provided between the bottom wall face of the motor receiving hole 29 and the rear end frame of the motor 2 or the end yoke of the motor 2. Thus, vibration transmitted from the engine can be insulated, so that vibration proof property of the motor 2 can be enhanced. Besides, the motor 2 can be pressed onto the first motor connection of the metallic plate 4 described in the first embodiment, so that the motor 2 can be more effectively fixed in the motor receiving hole 29 of the motor housing 13.

(Third Embodiment)

Figure 7A:
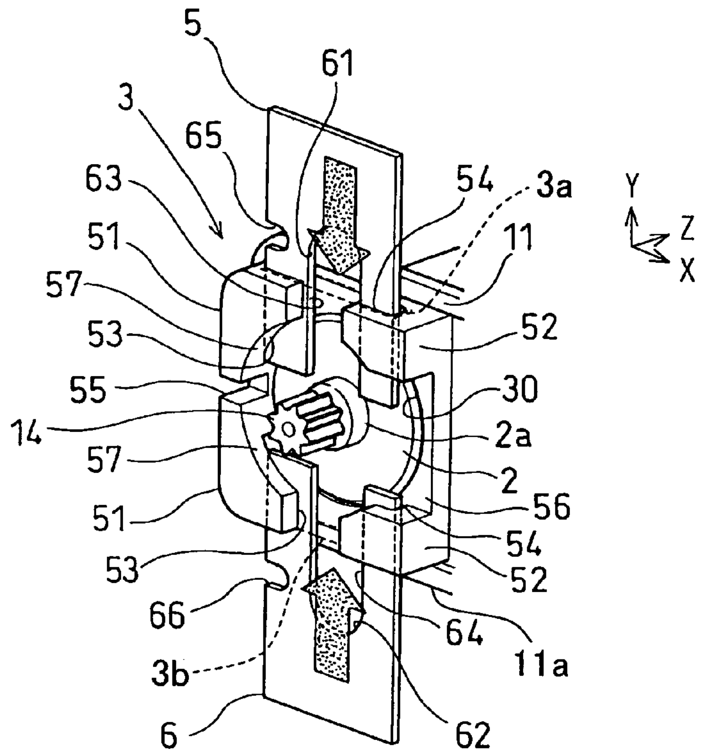
FIG. 7A is a perspective view showing plates and the housing receiving the motor.
Figure 7B:
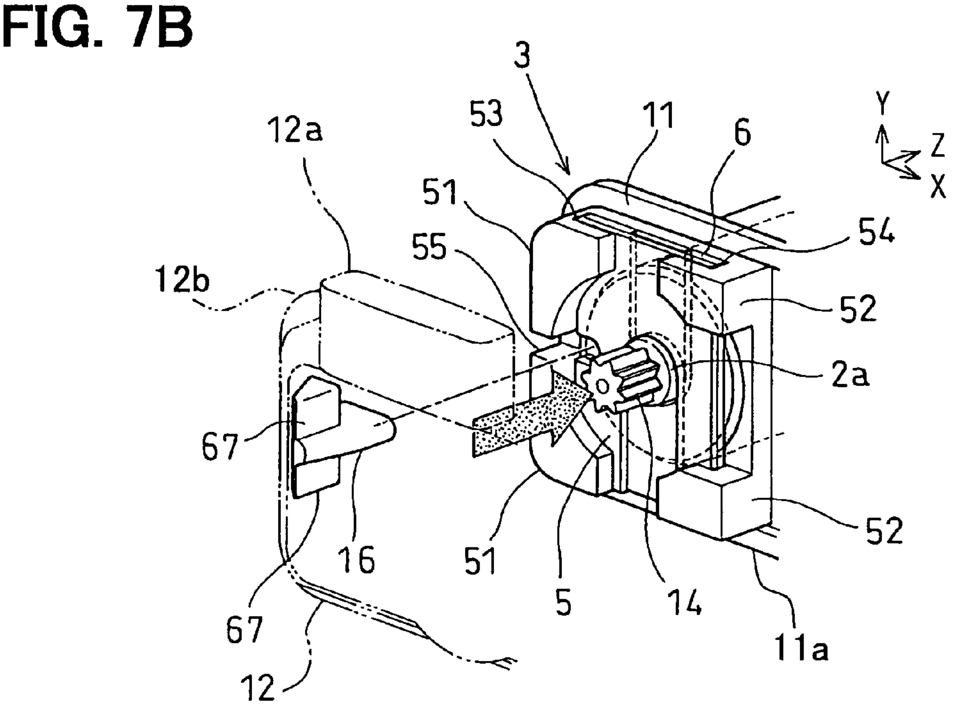
FIG. 7B is a perspective view showing the sensor cover and the plates attached to the housing according to a third embodiment in the present invention.

As shown in FIGS. 7A and 7B, a pair of first protrusions 51 and a pair of second protrusions 52 are formed on the bottom wall portion of the gearbox 11 of the throttle body 3 in the vicinity of the motor insertion hole 30. The pair of the first protrusions 51 are arranged substantially symmetrically with respect to the x-axis in FIG. 7A. The pair of the second protrusions 52 are also arranged substantially symmetrically with respect to the x-axis in FIG. 7A.

The first protrusions 51 respectively have first undercut grooves 53 serving undercut portions that are formed on the inner faces of the first protrusions 51. The second protrusions 52 respectively have second undercut grooves 54 serving undercut portions that are formed on the inner faces of the second protrusions 52, such that the second undercut grooves 54 respectively oppose to the first undercut grooves 53 in the horizontal direction in FIG. 7A. A first metallic plate 5 and a second metallic plate 6 are inserted along the first and second undercut grooves 53, 54.

The first and second undercut grooves 53, 54 are formed along the vertical direction in FIG. 7A in the same direction in which the first and second metallic plates 5, 6 are attached to the throttle body 3 along the plus and minus direction of the Y-axis in FIG. 7A. The first and second protrusions 51, 52 can be integrally connected with each other on the front side, i.e., on the minus direction side of the Z-axis in the axial direction of the motor 2 with respect to the first and second metallic plates 5, 6. That is, the first and second protrusions 51, 52 can be integrally connected to receive the first and second metallic plates 5, 6 horizontally in FIG. 7A.

A substantially rectangular space (first metallic plate insertion hole) 3*a* is formed between the first undercut groove 53 formed in the first protrusion 51 and the second undercut groove 54 formed in the second protrusion 52 on the upper side in FIG. 7A. A substantially rectangular space (second metallic plate insertion hole) 3*b* is formed between the first undercut groove 53 and the second undercut groove 54 on the lower side in FIG. 7A. The first and second metallic plate insertion holes 3*a*, 3*b* respectively have a height along the Z-axis in FIG. 7A, and each height of the first and second metallic plate insertion holes 3*a*, 3*b* is equivalent to the thickness of the two first and second metallic plates 5, 6.

A boss engaging groove 55 is formed between the first protrusions 51 vertically in FIG. 7A. An engaging boss (plate restricting means) 16, which is insert-formed in the sensor cover 12, engages with the boss engaging groove 55. A substantially rectangular opening 56 is formed between the second protrusions 52 to receive the middle reduction gear (not shown) of the reduction gears therebetween.

The first protrusions 51 respectively have arc-shaped recessions 57. The arc-shaped recessions 57 respectively have arc-shapes, such that the arc-shapes form a part of a circle having a center substantially corresponding to the axis of the motor insertion hole 30. The motor 2 can be easily inserted into the motor receiving hole 29 through the arc-shaped recessions 57 and the motor insertion hole 30.

The first and second metallic plates 5, 6 are inserted along the first and second undercut grooves 53, 54 to be fixed to the first and second protrusions 51, 52. In this situation, the first and second metallic plates 5, 6 cover the axially first end side (front side) of the motor 2 and the axially front side of the motor insertion hole 30 in the minus direction of the Z-axis.

The first and second metallic plates 5, 6 respectively have substantially semicircular first and second motor engaging holes 61, 62 that respectively engage with the first small diametric protrusion 2*a* of the motor 2 to construct first and second motor protrusion connections. Thus, the motor 2 is restricted from rightwardly and leftwardly moving radially in the plus and the minus directions of the X-axis, and the motor 2 is restricted from upwardly and downwardly moving radially in the plus and the minus directions of the Y-axis by the first and second motor protrusion connections.

The metallic plates 5, 6 respectively have supported portions in the left and right ends thereof that are respectively inserted into the first and second undercut grooves 53, 54, so that the supported portions are respectively supported by the first and second protrusions 51, 52. The end face of the second metallic plate 6 on the side of the motor 2 contacts with one axial end face of the motor 2, i.e., first end face of the front end frame of the motor 2 to construct a first motor connection that restricts movement of the motor 2 in the axial direction of the motor 2.

The first and second metallic plates 5, 6 respectively have substantially rectangular first and second notches 63, 64 that respectively communicate with the first and second motor engaging holes 61, 62. The second and first notches 64, 63 respectively open upwardly and downwardly in the radial direction of the motor 2, i.e., plus and minus direction of the Y-axis in FIG. 7A. That is, the first and second notches 63, 64 respectively open substantially along the direction, in which the first and second metallic plates 5, 6 are inserted between the undercut grooves 53, 54 respectively formed in the first and second protrusions 51, 52.

The first and second notches 63, 64 of the first and second metallic plates 5, 6 respectively open substantially in the same direction in which the first and second motor engaging holes 61, 62 of the first and second metallic plates 5, 6 respectively engage with the first small diametric protrusion 2*a* of the motor 2.

The first and second notches 63, 64 respectively have a width substantially same as the diameter of the first small diametric protrusion 2*a* of the motor 2. First and second boss engaging holes 65, 66 are respectively formed in the first and second metallic plates 5, 6 on the outer side with respect to the first and second motor engaging holes 61, 62. The first and second boss engaging holes 65, 66 respectively substantially leftwardly open along the minus direction of the X-axis in the radial direction of the motor 2. The first and second boss engaging holes 65, 66 respectively have a lengthened substantially semicircular shape that corresponds to a shape of an engaging boss 16, which is insert-formed in the sensor cover 12, so that the engaging boss 16 can engage with the first and second boss engaging holes 65, 66.

The first and second boss engaging holes 65, 66 are arranged in a predetermined position, such that the first and second boss engaging holes 65, 66 substantially correspond to the position of the boss engaging groove 55 formed between the first protrusions 51, when the first and second metallic plates 5, 6 are fixed to the throttle body 3.

The engaging boss 16 is insert-formed in the sensor cove 12. The engaged portion 12*b* of the sensor cover 12 is engaged with the protruded engaging portion 11*a* formed on the side of the opening of the gearbox 11 of the throttle body 3. Simultaneously, the engaging boss 16 engages with the boss engaging groove 55 formed between the first protrusions 51, and the engaging boss 16 engages with the first and second boss engaging holes 65, 66 respectively formed in the first and second metallic plates 5, 6.

The engaging boss 16 is formed of a metallic material such as brass, stainless steel or an elastic material such as rubber. The engaging boss 16 is constructed of a substantially elongated circular portion (engaging portion), a pair of protrusions 67 and the like. The substantially elongated circular portion engages with the boss engaging groove 55, the first and second boss engaging holes 65, 66. The protrusions 67 of the engaging boss 16 respectively axially contact with the front end faces of the first protrusions 51. The engaging boss 16, the boss engaging groove 55, the first and second boss engaging holes 65, 66 engage with each other to construct a metallic plate connection. The metallic plate connection restricts the first and second metallic plates 5, 6 from horizontally moving in the plus and the minus directions of the X-axis in FIG. 7B in the radial direction of the motor 2, i.e., substantially perpendicularly to the direction of thickness of the first and second metallic plates 5, 6. The metallic plate connection also restricts the first and second metallic plates 5, 6 from vertically moving in the plus and the minus directions of the Y-axis in FIG. 7B in the radial direction of the motor 2, i.e., substantially parallel to the direction, in which the first and second metallic plates 5, 6 are inserted between the undercut grooves 53, 54.

As follows, an assembling process of the throttle control apparatus in this embodiment is described.

The motor 2 is inserted into the motor receiving hole 29 of the motor housing 13 from the motor insertion hole 30 formed in the bottom portion of the gearbox 11 of the throttle body 3. As shown in FIG. 7A, subsequently, the first metallic plate 5 is inserted between the first and second protrusions 51, 52 in the insertion direction of the first metallic plate 5. That is, the first metallic plate 5 is downwardly moved substantially in the minus direction of the Y-axis along the radial direction of the motor 2, i.e., substantially parallel to the one axial end face of the front end flame of the motor 2. The left and right ends of the first metallic plate 5 are respectively inserted into the undercut grooves 53, 54 that are respectively formed in the inner faces of the first and second protrusions 51, 52 that oppose to each other.

Subsequently, the second metallic plate 6 is inserted between the first and second protrusions 51, 52 in the insertion direction of the second metallic plate 6, i.e., upwardly in the plus direction of the Y-axis along the radial direction of the motor 2 parallel to the one axial end face of the front end flame of the motor 2. The left and right ends of the second metallic plate 6 are respectively inserted into the undercut grooves 53, 54 that are respectively formed in the inner faces of the first and second protrusions 51, 52 opposing to each other. The first and second metallic plates 5, 6 are temporally fixed to the throttle body 3. In this situation, the first and second metallic plates 5, 6 cover the axially first end side (front side) of the motor 2 and the axially front side of the motor insertion hole 30 on the side in the minus direction of the Z-axis in FIG. 7A. Thus, the first and second metallic plates 5, 6 overlap one another, such that the first metallic plate 5 is located on the front end side of the second metallic plate 6 in the minus direction of the Z-axis in FIG. 7A.

The left and right ends of the first and second metallic plates 5, 6 are respectively inserted into the first and second undercut grooves 53, 54. The first small diametric protrusion 2*a* of the motor 2 engages with the first and second motor engaging holes 61, 62 of the first and second metallic plates 5, 6 through the first and second notches 63, 64. That is, the first and second motor engaging holes 61, 62 of the first and second metallic plates 5, 6 radially surround the first small diametric protrusion 2*a* of the motor 2. Thus, the motor 2 is restricted from vertically and horizontally moving radially in the plus and the minus directions of the Y-axis and the X-axis. Besides, the motor 2 is restricted from axially moving in the minus direction of the Z-axis. The motor 2 is also restricted from axially moving in the plus direction of the Z-axis by the bottom wall face of the bottom wall portion of the motor housing 13, i.e., the bottom wall face of the motor receiving hole 29. The first and second metallic plates 5, 6 are restricted from horizontally moving perpendicularly to the direction of the thickness thereof in the plus and the minus directions of the X-axis by the bottom face of the first and second undercut grooves 53, 54 of the throttle body 3. The first and second metallic plates 5, 6 are restricted from moving in the axial direction of the motor 2 in the plus and the minus directions of the Z-axis by the side face of the first and second undercut grooves 53, 54 of the throttle body 3.

As show in FIG. 7B, the engaged portion 12*b* of the sensor cover 12 is engaged with the protruded engaging portion 11*a* formed on the side of the opening of the gearbox 11 of the throttle body 3. Simultaneously, the engaging boss 16, the boss engaging groove 55 formed between the first protrusions 51 and the first and second boss engaging holes 65, 66 respectively formed in the first and second metallic plates 5, 6 are engaged with each other. Therefore, the first and second metallic plates 5, 6 are restricted from vertically moving in the plus and the minus directions of the Y-axis in FIG. 7B substantially perpendicularly to the direction of the thickness thereof.

Thus, the first and second metallic plates 5, 6 are fixed to the throttle body 3 such that the first and second metallic plates 5, 6 respectively surround the axially one end side (front side) of the motor 2 and the axially front side of the motor insertion hole 30 on the side in the minus direction of the Z-axis in FIG. 7A. Therefore, the motor 2 can be further steadily fixed (restricted) in the motor housing 13 compared with the structure, in which the first and second metallic plates 5, 6 are screwed to the throttle body 3.

Here, spring hooks can be respectively provided to the right and left ends of the first and second metallic plates 5, 6 to resiliently hook respectively to the upper and lower ends of the first and second protrusions 51, 52. Alternatively, spring hooks can be respectively provided to the inner peripheries of the first and second notches 63, 64 of the first and second metallic plates 5, 6 to resiliently hook to the first small diametric protrusion 2*a* of the motor 2.

In this structure, the motor 2 and the first and second metallic plates 5, 6 can be fixed (restricted) to the throttle body 3, even the engaging boss 16 is not provided to the sensor cover 12. Especially, the first and second metallic plates 5, 6 can be restricted from moving in both facial directions, in which the first and second metallic plates 5, 6 are inserted along the first and second undercut grooves 53, 54 and the opposite direction as the insertion direction of the first and second metallic plates 5, 6. That is, the first and second metallic plates 5, 6 can be restricted in the plus and the minus directions of the Y-axis. Therefore, components and production cost can be reduced.

(Fourth Embodiment)

Figure 8A:
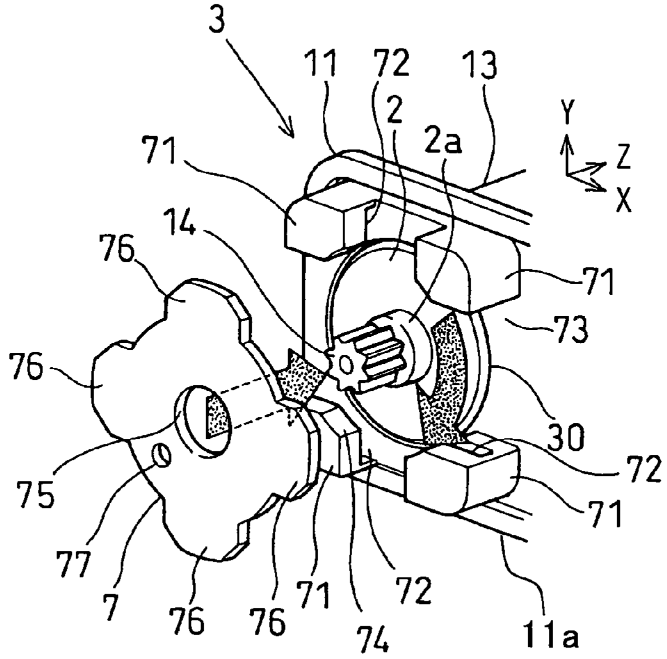
FIG. 8A is a perspective view showing a plate and the housing receiving the motor.
Figure 8B:
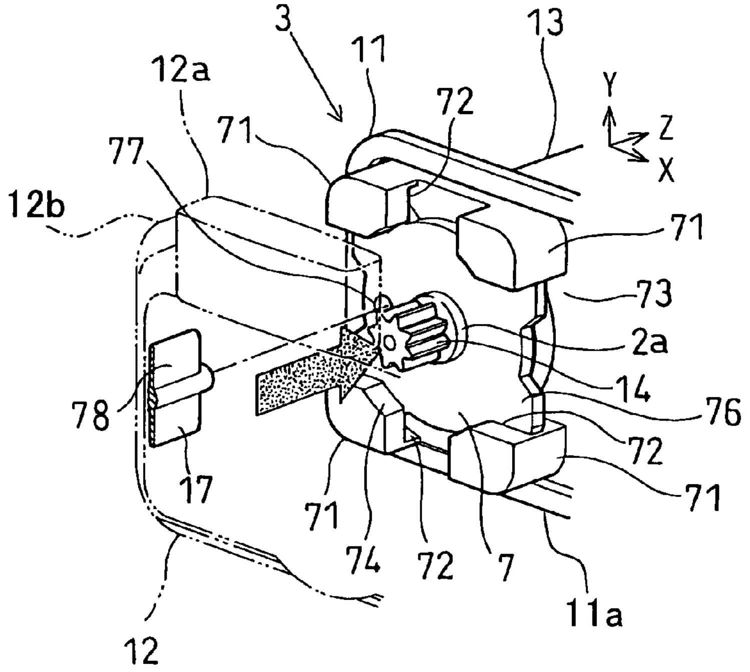
FIG. 8B is a perspective view showing the sensor cover and the plate attached to the housing according to a fourth embodiment in the present invention.
Figure 10:
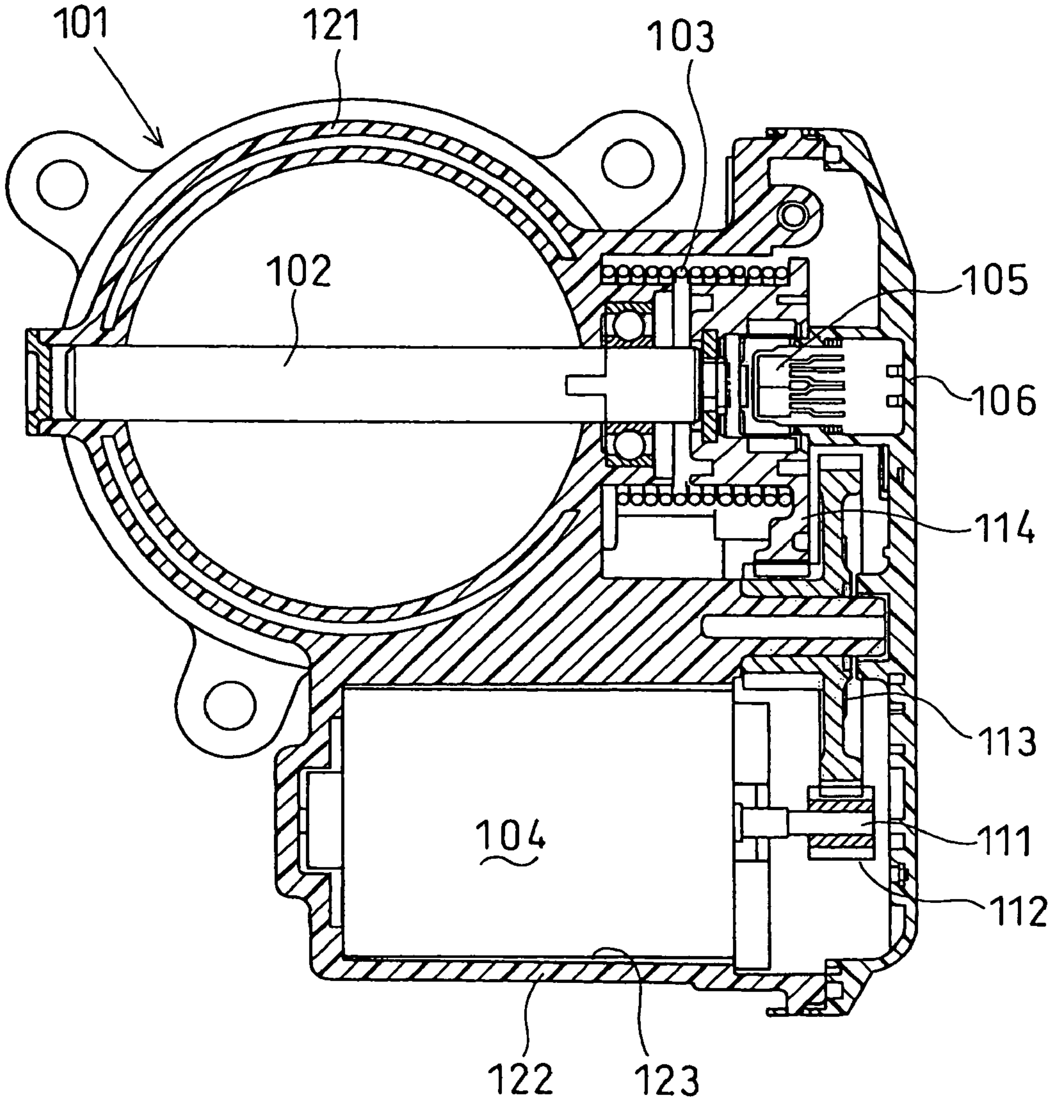
FIG. 10 PRIOR ART
FIG. 10 is a cross-sectional top view showing a throttle apparatus according to a prior art.
Figure 11:
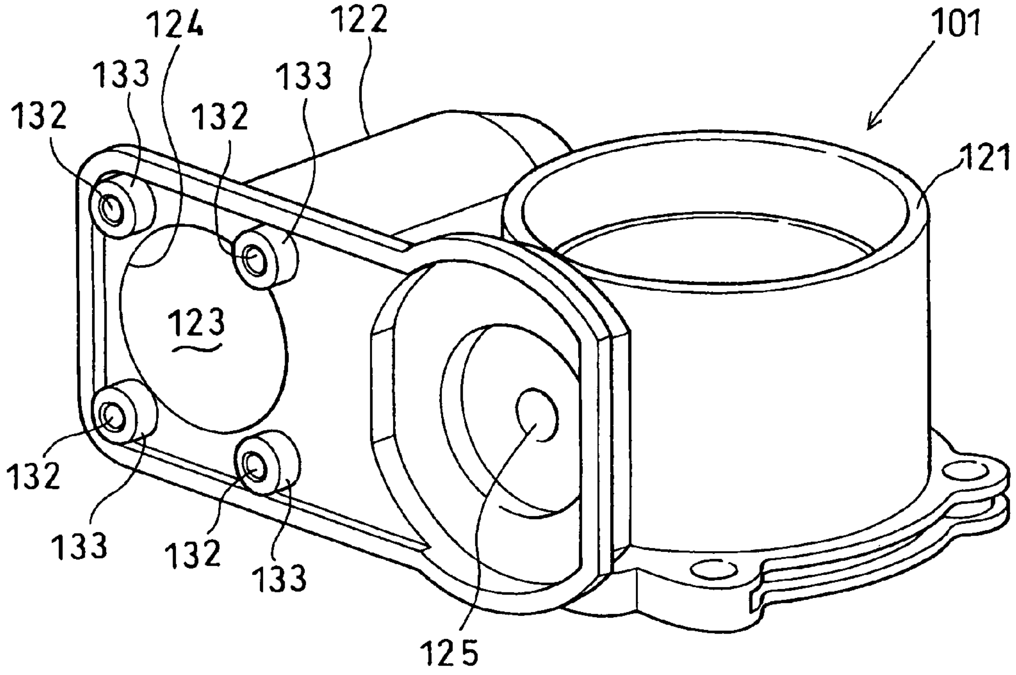
FIG. 11 PRIOR ART
FIG. 11 is a perspective rear view showing the throttle apparatus according to the prior art.
Figure 12:
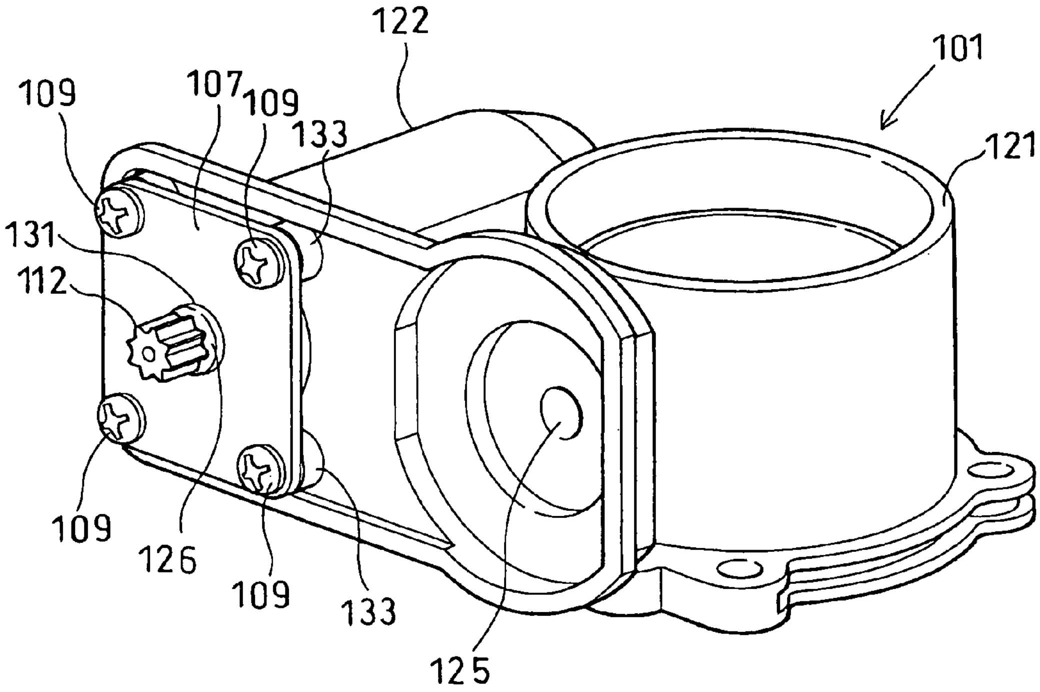
FIG. 12 PRIOR ART
FIG. 12 is a perspective view showing the throttle apparatus receiving the motor covered with a plate according to the prior art.

As shown in FIGS. 8A and 8B, multiple protrusions 71 are integrally formed on the bottom wall portion of the gearbox 11 of the throttle body 3 in the vicinity of the motor insertion hole 30. The protrusions 71 are arranged substantially symmetrically with respect to the X-axis and the Y-axis in the radial direction of the motor insertion hole 30.

The protrusions 71 are arranged along a circumferential direction of the motor 2 by predetermined intervals to circumferentially partially surround the motor insertion hole 30 on the one axial end side of the motor 2.

Multiple undercut grooves 72 are respectively formed in the inner wall face of the protrusions 71 opposing to each other, such that a metallic plate 7 can be inserted along the undercut grooves 72. The undercut grooves 72 are undercut portions formed in a forming process of the throttle body 3. The undercut grooves 72 respectively extend in the circumferential direction (rotating direction) of the motor insertion hole 30 that is substantially parallel to the direction, in which the metallic plate 7 is fixed to the throttle body 3.

A substantially rectangular space (metallic plate insertion hole) is formed on circumferentially end faces of each protrusion 71, such that the rectangular space respectively has a width that is substantially same as the thickness of the metallic plate 7.

A rectangular opening 73 is formed between the circumferentially adjacent protrusions 71 on the right side in FIG. 8A. The metallic plate 7 partially passes through the rectangular opening 73, when the metallic plate 7 is attached to the throttle body 3 in the axial direction of the motor 2. The metallic plate 7 is attached to the throttle body 3, so that the metallic plate 7 is fixed to the outer circumferential periphery of the first small diametric protrusion 2*a* of the motor 2. In this situation, the metallic plate 7 is located in the same plane as the plane imaginary formed by the undercut grooves 72 substantially perpendicularly to the axial direction of the motor 2. The rectangular opening 73 formed between the protrusions 71 on the right side in FIG. 8A is also used as an opening that partially receives the middle reduction gear (not shown) of the reduction gears.

Arc-shaped recessions 74 are respectively formed in the inner faces of the protrusion 71 on the side of the motor insertion hole 30. The arc-shaped recessions 74 respectively have arc-shapes, such that the arc-shapes form a part of a circle having a center substantially corresponding to the axis of the motor insertion hole 30. The motor 2 can be easily inserted into the motor receiving hole 29 through the arc-shaped recessions 74 and the motor insertion hole 30.

The metallic plate 7 is inserted between the undercut grooves 72, so that the metallic plate 7 is fixed to the undercut grooves 72. The metallic plate 7 covers the axially one end side (front side) of the motor 2 and the axially front side of the motor insertion hole 30 on the side in the minus direction of the Z-axis in FIG. 8B. The metallic plate 7 has a substantially circular motor engaging hole 75 that engages with the first small diametric protrusion 2*a* of the motor 2. The engaging hole 75 of the metallic plate 7 and the first small diametric protrusion 2*a* of the motor 2 engage with each other to construct first and second motor protrusion connections. The first and second motor protrusion connections respectively restrict the motor 2 from vertically and horizontally moving radially in the plus and the minus directions of the X-axis and Y-axis, i.e., in the facial direction of the metallic plate 7. The metallic plate 7 has multiple peripheral protrusions 76 (supported portions) on the radially outer periphery thereof. The peripheral protrusions 76 are respectively inserted into the corresponding undercut grooves 72, and supported by the corresponding protrusions 71. The face of the metallic plate 7 on the side of the motor 2 contacts with the axially one end side of the motor 2, i.e., one end face of the front end frame of the motor 2 on the side of the motor insertion hole 30 to construct a first motor connection. The first motor connection restricts the motor 2 from axially moving. An engaging boss (plate restricting means) 17 is insert-formed in the sensor cover 12. The metallic plate 7 has a boss engaging hole 77 on the radially outer side with respect to the motor engage hole 75. The boss engaging hole 77 has a substantially circular shape that corresponds to the shape of the tip end of the engaging boss 17, such that the engaging boss 17 can engage with the metallic plate 7.

The engaged portion 12*b* of the sensor cover 12 is engaged with the protruded engaging portion 11*a* formed on the side of the opening of the gearbox 11 of the throttle body 3. In this situation, the engaging boss 17, which is insert-formed in the sensor cover 12, engages with the boss engaging hole 77 of the metallic plate 7. The engaging boss 17 is formed of a metallic material such as brass, stainless steel or an elastic material such as rubber. The engaging boss 17 is constructed of a substantially circular portion (engaging portion), protrusions 78 and the like. The substantially circular portion engages with the boss engaging hole 77 of the metallic plate 7. The protrusions 78 respectively contact with the axially front end face of the metallic plate 7.

The engaging boss 17 engages with the boss engaging hole 77 of the metallic plate 7 to construct a metallic plate connection. The metallic plate connection restricts the metallic plate 7 from horizontally and vertically moving in the plus and the minus directions of the X-axis and Y-axis, i.e., in the facial direction of the metallic plate 7 substantially perpendicularly to the direction of the thickness of the metallic plate 7. The metallic plate connection also restricts the metallic plate 7 from circumferentially moving in the rotating direction thereof, in which the metallic plate 7 is attached to the throttle body 3 by rotating around the axis of the motor 2 and an opposite direction as the direction, in which the metallic plate 7 is attached to the throttle body 3.

As follows, an assembling process of the throttle control apparatus in this embodiment is described.

The motor 2 is inserted into the motor receiving hole 29 of the motor housing 13 from the motor insertion hole 30 formed in the bottom portion of the gearbox 11 of the throttle body 3. As shown in FIG. 8A, subsequently, one of the peripheral protrusions 76 of the metallic plate 7 is inserted into the rectangular opening 73 formed between the adjacent protrusions 71, and the first small diametric protrusion 2*a* of the motor 2 is engaged with the hole 75 of the metallic plate 7, simultaneously. In this situation, the motor engaging hole 75 of the metallic plate 7 circumferentially surrounds the first small diametric protrusion 2*a* of the motor 2. Subsequently, as shown in FIG. 8B, the metallic plate 7 is rotated around the first small diametric protrusion 2*a* of the motor 2, i.e., around the Z-axis, so that the peripheral protrusions 76 of the metallic plate 7 are respectively inserted into the undercut grooves 72. The metallic plate 7 is temporally fixed to the throttle body 3, such that the metallic plate 7 covers the axially first end side (front side) of the motor 2 and the axially front side of the motor insertion hole 30 on the side in the minus direction of the Z-axis in FIG. 8B.

Thus, the motor 2 is restricted from vertically and horizontally moving radially in the plus and the minus directions of the Y-axis and the X-axis. Besides, the motor 2 is restricted from axially moving in the minus direction of the Z-axis. The motor 2 is restricted from axially moving in the plus direction of the Z-axis by the bottom wall face of the bottom wall portion of the motor housing 13, i.e., the bottom wall face of the motor receiving hole 29. The metallic plate 7 is restricted from horizontally moving in the plus and the minus directions of the X-axis by the bottom face of the undercut grooves 72 of the throttle body 3. The metallic plate 7 is also restricted from moving in the axial direction of the motor 2 in the plus and the minus directions of the Z-axis by the side face of the undercut grooves 72 of the throttle body 3.

As show in FIG. 8B, the engaged portion 12*b* of the sensor cover 12 is engaged with the protruded engaging portion 11*a* formed on the side of the opening of the gearbox 11 of the throttle body 3. Simultaneously, the engaging boss 17, which is insert-formed in the sensor cover 12, and the boss engaging hole 77 of the metallic plate 7 are engaged with each other, so that the metallic plate 7 can be restricted from circumferentially rotating around the Z-axis. In this situation, the protrusions 78 of the engaging boss 17 contact with the front end face of the metallic plate 7.

Thus, the metallic plate 7 is fixed to the throttle body 3 such that the metallic plate 7 covers the axially first end side (front side) of the motor 2 and the axially front side of the motor insertion hole 30 on the side in the minus direction of the Z-axis in FIG. 8B. Therefore, the motor 2 can be further steadily fixed (restricted) in the motor housing 13 compared with the structure, in which the metallic plate 7 is screwed to the throttle body 3.

Here, spring hooks can be respectively provided to the outer circumferential periphery of the peripheral protrusions 76 of the metallic plate 7 to resiliently hook respectively to the protrusions 71 integrally formed on the throttle body 3. In this structure, the motor 2 and the metallic plate 7 can be fixed to the throttle body 3, even the engaging boss 17 is not provided to the sensor cover 12. Especially, the metallic plate 7 can be restricted from moving in both circumferential directions, in which the metallic plate 7 is partially inserted along the undercut grooves 72 and the opposite direction as the insertion direction of the metallic plate 7 along the undercut grooves 72. That is, the metallic plate 7 can be restricted in the plus and the minus directions of the Z-axis. Therefore, components and production cost can be further reduced.

(Fifth Embodiment)

Figure 9:
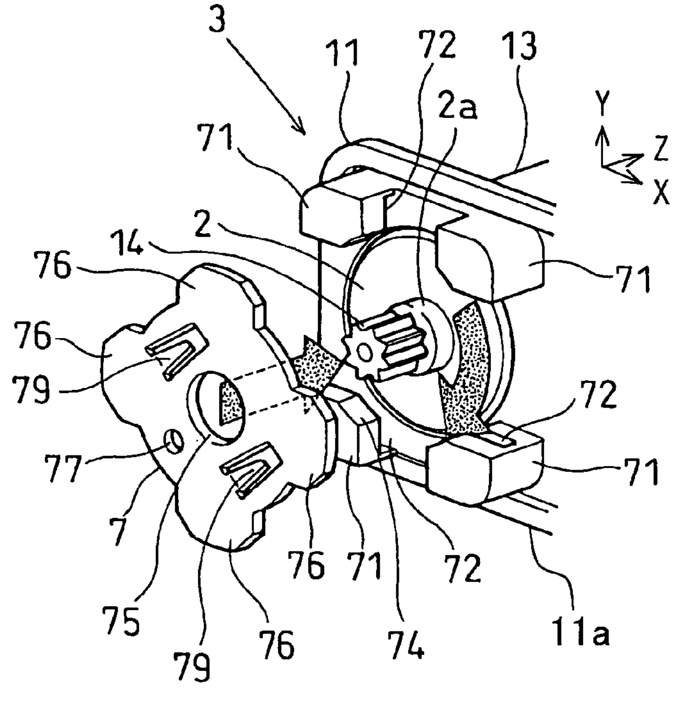
FIG. 9 is a perspective view showing a plate and the housing receiving the motor according to a fifth embodiment in the present invention.

As shown in FIG. 9, spring portions 79 are integrally formed in the metallic plate 7 radially outwardly with respect to the motor engaging hole 75. The spring portions 79 contact with the axially one end of the motor 2, i.e., one end face of the front end frame of the motor 2 on the side of the insertion hole 30. The spring portions 79 are resilient members that can resiliently deform in a substantially same direction as the axial direction of the motor 2. The spring portions 79 resiliently press onto the axially one end side of the motor 2, so that the motor 2 can be restricted from axially moving in the plus and the minus directions of the Z-axis. A spring portion can be formed in the metallic plate 4 in the first embodiment, and the second metallic plate 6 in the third embodiment.

(Other Embodiment)

The central axis of the bore inner pipe 18 can be eccentrically arranged with respect to the central axis of the bore outer pipe 19 to construct the bore wall part 10 having an eccentric double-pipe structure. That is, the axial center of the bore inner pipe 18 can be eccentrically arranged on an internally one side of the bore outer pipe 19 in the radial direction of the bore outer pipe 19, e.g., vertically lower side of the bore outer pipe 19 in its installation condition. Here, the radial direction of the bore wall part 10 is perpendicular to the axial direction of the bore wall part 10. Alternatively, the axial center of the bore inner pipe 18 can be eccentrically arranged on internally another side of the bore outer pipe 19 in the radial direction of the bore outer pipe 19, e.g., vertically upper side of the bore outer pipe 19 in its installation condition. The bore wall part 10 of the throttle body 3 can be a single pipe structure.

The blockade recess parts 21, 22 are formed between the bore inner pipe 18 and the bore outer pipe 19 for blocking moisture or liquid flowing into the bore wall part 10 from both of the upstream and the downstream sides of the throttle valve 1. The blockade recess parts 21, 22 are used to restrict the throttle valve 1 from icing in a cold period such as winter, without additional components, such as an additional piping member for introducing engine-cooling water into the throttle body 3. Alternatively, only the blockade recess part 21 can be provided in the bore wall part 10 for blocking moisture or liquid flowing from the upstream side of the throttle valve 1 into the bore wall part 10 along the inner periphery of the intake pipe.

A bypass passage can be provided on the outer peripheral side of the bore outer pipe 19 for bypassing the throttle valve 1. Furthermore, an idling speed control valve (ISC valve) can be provided in the bypass passage for controlling idling speed of the engine 80 by adjusting a flow amount of air passing through the bypass passage. An outlet port of blowby gas discharged from a positive crankcase ventilator (PCV) or a purge tube connected to a vapor recovery equipment for recovering vaporized gasoline may be connected to the intake pipe located on the upstream side of intake airflow with respect to the bore wall part 10 of the throttle body 3. In this case, engine oil contained in blowby gas may accumulate to be deposit on the inner wall of the intake pipe. However, in this structure, foreign material such as mist or deposit of blowby gas flowing along the inner wall of the intake pipe can be blocked by the blockade recess part 21, so that the throttle valve 1 and the throttle shaft 9 can be restricted from occurrence of a failure.

A cushion member such as a resilient member and an elastic member can be provided to the bottom wall portion of the motor housing 13. The cushion member contacts with the axially other end portion of the motor 2 around the bottom wall portion, and the cushion member can resiliently or elastically deform in the substantially axial direction of the motor 2. In this structure, the motor 2 is pressed to the metallic plate 4, 6, 7 on the one axial end, i.e., the motor connections of the metallic plate 4, 6, 7 by the cushion member that is integrally or separately provided to the motor housing 13. Thus, the motor 2 can be restricted from axially moving in the minus direction of the Z-axis.

The resinous disc portion (disc-shaped portion) and the resinous shaft portion (cylindrical portion) of the throttle valve 1, and the bore wall part 10 of the throttle body 3 and the motor housing 13 can be formed of a resinous composite material, such as PBTG30 (poly butylene terephthalate including grass fiber by 30%). For example, heated molten thermoplastic containing filler such as low cost grass fiber, carbon fiber, aramid fiber, and boron fiber can be used as the composite material. The resinous throttle valve and the resinous throttle body can be formed using injection molding of the resinous composite material with high formability. In this case, mechanical property, such as strength, rigidity and thermostability of the product such as the throttle valve and the throttle body can be enhanced. Furthermore, the products can be produced at a low cost.

Various modifications and alternations may be diversely made to the above embodiments without departing from the spirit of the present invention.

What is claimed is:

1. A manufacturing method of a throttle control apparatus having a resinous throttle body integrally formed with a substantially cylindrical motor housing defining a motor insertion hole, the throttle body defining an undercut portion in the vicinity of the motor insertion hole, the method comprising the steps of:

inserting the motor into the motor housing through the motor insertion hole;

inserting a plate along the undercut portion such that the plate covers the motor insertion hole so that the plate restricts movement of the motor in an axial direction of the motor; and engaging a motor engaging hole defined in the plate with the motor such that the plate restricts movement of the motor in a radial direction of the motor.

2. The manufacturing method according to claim 1, further comprising:

connecting a cover to the motor housing on the side of the motor insertion hole that is covered with the plate; and engaging a plate restricting means, which is provided to the cover, with an engaging hole defined in the plate to restrict movement of the plate in a substantially same direction as a direction in which the plate is inserted along the undercut portion.

3. The manufacturing method according to claim 1, wherein the plate is inserted along the undercut portion substantially simultaneously with engagement between the motor and the motor engaging hole defined in the plate.

4. The manufacturing method according to claim 1, wherein the plate is connected to the motor from an opposite side as the throttle body in the axial direction of the motor after inserting the motor into the motor housing, and the plate is rotated around an axis of the motor so that the plate is inserted along the undercut portion.

5. A throttle control apparatus for an internal combustion engine having cylinders, the throttle control apparatus comprising:

a throttle body that defines a cylindrical air intake passage communicating with the cylinders;

a throttle valve that is received in the air intake passage;

a substantially cylindrical motor housing that is integrally formed of resin with the throttle body, the motor housing defining a motor insertion hole;

a motor that is inserted into the motor housing through the motor insertion hole, the motor rotating the throttle valve to open and close the air intake passage; and a plate that is attached to the throttle body, wherein the plate defines a motor engaging hole that engages with the motor such that the plate restricts movement of the motor in a radial direction of the motor, the throttle body defines an undercut portion in the vicinity of the motor insertion hole, and the plate is inserted along the undercut portion so that the plate is supported by the throttle body such that the plate covers the motor insertion hole to restrict movement of the motor in an axial direction of the motor.

6. The throttle apparatus according to claim 5, wherein the plate has a spring portion that contacts with an axial end of the motor on the side of the motor insertion hole, and the spring portion biases the motor in a substantially axial direction of the motor from the axial end of the motor.

7. The throttle apparatus according to claim 5, further comprising:

a resilient member that is received in the motor housing, wherein the resilient member contacts with an axial end of the motor which is opposite as the motor insertion hole with respect to the motor in the axial direction of the motor, and the resilient member biases the motor to the motor insertion hole in the axial direction of the motor.

8. The throttle apparatus according to claim 5, further comprising:

an elastic member that is received in the motor housing, wherein the elastic member contacts with an axial end of the motor which is opposite as the motor insertion hole with respect to the motor in the axial direction of the motor, and the elastic member biases the motor to the motor insertion hole in the axial direction of the motor.

9. The throttle apparatus according to claim 5, wherein the plate defines a notch that communicates with the motor engaging hole, the notch opens in a substantially radial direction of the motor with respect to the motor engaging hole, and the notch opens in a substantially same direction as a direction in which the plate is inserted along the undercut portion.

10. The throttle apparatus according to claim 9, wherein the throttle body has at least two protrusions in the vicinity of the motor insertion hole, the protrusions oppose to each other substantially perpendicularly to the axial direction of the motor, over the motor received in the motor insertion hole, the protrusions respectively define the undercut portion that respectively has a grooved shape extending in a substantially same direction as a direction in which the plate is inserted along the undercut portions, the undercut portions of the protrusions oppose to each other substantially perpendicularly to the axial direction of the motor, over the motor received in the motor insertion hole, and the plate is movable in a direction substantially perpendicularly to the axial direction of the motor along the undercut portions such that the plate is inserted between the undercut portions that oppose to each other.

11. The throttle apparatus according to claim 5, further comprising:

a sensor cover that receives a rotation angle sensor that detects a rotation angle of the throttle valve, wherein the sensor cover is connected to an opening side of the motor housing, the sensor cover has a plate restricting means that restricts movement of the plate in a substantially same direction as a direction in which the plate is inserted along the undercut portions, and the plate restricting means restricts movement of the plate in a substantially opposite direction as the direction in which the plate is inserted along the undercut portions.

12. The throttle apparatus according to claim 11, wherein the plate defines a boss engaging hole on the outer side of the motor engaging hole in the radial direction of the motor, and the plate restricting means engages with the boss engaging hole.

13. The throttle apparatus according to claim 5, wherein the throttle body has at least two protrusions that are arranged along a circumferential direction of the motor at predetermined intervals to partially surround the motor insertion hole, protrusions respectively have the undercut portion that respectively has a grooved shape formed in an inner wall of the protrusions internally in the radial direction of the motor, the undercut portions of the protrusions respectively extend in a substantially same direction as a direction in which the plate is inserted along the undercut portions, the motor engaging hole of the plate is engageable with the motor, and the plate is rotatable around the axis of the motor in a direction in which the plate is inserted between the undercut portions opposed to each other when the motor engaging hole of the plate engages with the motor.

14. The throttle apparatus according to claim 13, further comprising:

a cover that is connected to an opening side of the motor housing, wherein the cover has a plate restricting means that restricts movement of the plate in a substantially same direction as a direction in which the plate is inserted between the undercut portions, and the plate restricting means restricts movement of the plate in a substantially opposite direction as the direction in which the plate is inserted between the undercut portions.

15. The throttle apparatus according to claim 14, wherein the plate defines a boss engaging hole on the outer side of the motor engaging hole, the plate restricting means is insert-formed in the sensor cover, and the plate restricting means engages with the boss engaging hole.

* * * * *